US012130581B2

(12) United States Patent
Maeshima et al.

(10) Patent No.: US 12,130,581 B2
(45) Date of Patent: Oct. 29, 2024

(54) PROCESS CARTRIDGE AND IMAGE FORMING APPARATUS

(71) Applicant: CANON KABUSHIKI KAISHA, Tokyo (JP)

(72) Inventors: Hideki Maeshima, Mishima (JP); Kuniaki Hirukawa, Yokohama (JP); Shuichi Gofuku, Numazu (JP); Yoshihiro Mitsui, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/144,303

(22) Filed: May 8, 2023

(65) Prior Publication Data

US 2023/0273570 A1 Aug. 31, 2023

Related U.S. Application Data

(60) Division of application No. 17/524,018, filed on Nov. 11, 2021, now Pat. No. 11,687,029, which is a (Continued)

(30) Foreign Application Priority Data

Dec. 14, 2012 (JP) ................................ 2012-273204

(51) Int. Cl.

*G03G 21/18* (2006.01)
*G03G 15/08* (2006.01)

(52) U.S. Cl.

CPC ..... *G03G 21/1857* (2013.01); *G03G 21/1803* (2013.01); *G03G 15/0806* (2013.01); (Continued)

(58) Field of Classification Search

CPC .......... G03G 21/1857; G03G 21/1803; G03G 15/0806; G03G 15/0808; G03G 21/1825; (Continued)

(56) References Cited

U.S. PATENT DOCUMENTS 5,331,378 A 7/1994 Baker et al.
5,583,630 A 12/1996 Kimura et al.
(Continued)

FOREIGN PATENT DOCUMENTS

CN 1435735 Y 8/2003
CN 1450419 A 10/2003
(Continued)

OTHER PUBLICATIONS

Aug. 3, 2023 Communication in European Patent Application Pub. No. 22 171 733.3.

(Continued)

*Primary Examiner* — Francis C Gray
(74) *Attorney, Agent, or Firm* — Venable LLP

(57) ABSTRACT

A process cartridge includes a photosensitive drum; a developing roller; a developer supplying roller, provided in contact with the developing roller; a driving force receiving portion provided at a shaft end of the supplying roller; a first driving force transmitting portion; a second driving force transmitting portion; flexible sheets provided adjacent to an engaging portion between the first portion and the second portion to intermittently contact the second portion with rotation of the second portion, wherein a rotational direction of the roller is opposite to that of the roller, and a peripheral speed of the roller is larger than that of the roller.

53 Claims, 24 Drawing Sheets

Related U.S. Application Data division of application No. 17/034,272, filed on Sep. 28, 2020, now Pat. No. 11,314,201, which is a division of application No. 16/696,350, filed on Nov. 26, 2019, now Pat. No. 10,838,356, which is a division of application No. 15/960,750, filed on Apr. 24, 2018, now Pat. No. 10,691,063, which is a division of application No. 15/591,554, filed on May 10, 2017, now Pat. No. 9,964,921, which is a division of application No. 15/357,175, filed on Nov. 21, 2016, now Pat. No. 9,696,684, which is a continuation-in-part of application No. 14/737,680, filed on Jun. 12, 2015, now Pat. No. 9,519,264, which is a continuation of application No. PCT/JP2013/084174, filed on Dec. 13, 2013.

(52) U.S. Cl.
CPC ..... *G03G 15/0808* (2013.01); *G03G 21/1825* (2013.01); *G03G 21/185* (2013.01); *G03G 21/186* (2013.01); *G03G 2221/1657* (2013.01)

(58) Field of Classification Search
CPC ............... G03G 21/185; G03G 21/186; G03G 2221/1657
See application file for complete search history.

(56) References Cited

U.S. PATENT DOCUMENTS

| | | | | |
|---|---|---|---|---|
| 5,822,664 | A | 10/1998 | Oka et al. | |
| 6,947,686 | B2 | 9/2005 | Kawai et al. | |
| 6,968,142 | B2 | 11/2005 | Arimitsu et al. | |
| 6,980,758 | B2 | 12/2005 | Murayama et al. | |
| 7,046,942 | B2 | 5/2006 | Arimitsu et al. | |
| 7,052,112 | B2 | 5/2006 | Browning et al. | |
| 7,072,594 | B2 | 7/2006 | Hoshi et al. | |
| 7,072,603 | B2 | 7/2006 | Tsuzuki et al. | |
| 7,088,939 | B2 | 8/2006 | Maeshima et al. | |
| 7,127,194 | B2 | 10/2006 | Hoshi et al. | |
| 7,158,735 | B2 | 1/2007 | Murayama et al. | |
| 7,162,181 | B2 | 1/2007 | Maeshima et al. | |
| 7,212,773 | B2 | 5/2007 | Sudo | |
| 7,318,989 | B2 | 1/2008 | Kotsugai et al. | |
| 7,340,197 | B2 | 3/2008 | Murayama et al. | |
| 7,349,649 | B2 | 3/2008 | Hoshi et al. | |
| 7,813,671 | B2 | 10/2010 | Nittani et al. | |
| 8,213,828 | B2 | 7/2012 | Murayama et al. | |
| 8,369,743 | B2 | 2/2013 | Maeshima et al. | |
| 8,565,639 | B2 | 10/2013 | Nittani et al. | |
| 8,583,006 | B2 | 11/2013 | Murayama et al. | |
| 8,688,003 | B2 | 4/2014 | Maeshima et al. | |
| 9,063,501 | B2 | 6/2015 | Hirukawa et al. | |
| 10,691,063 | B2 * | 6/2020 | Maeshima | G03G 21/1857 |
| 2003/0156848 | A1 | 8/2003 | Kawai et al. | |
| 2003/0219276 | A1 | 11/2003 | Sato et al. | |
| 2004/0090832 | A1 | 5/2004 | Asauchi | |
| 2005/0036803 | A1 | 2/2005 | Maeshima et al. | |
| 2005/0111882 | A1 | 5/2005 | Sudo et al. | |
| 2005/0158077 | A1 | 7/2005 | Kwon | |
| 2005/0196188 | A1 | 9/2005 | Kunugi et al. | |
| 2005/0214029 | A1 * | 9/2005 | Kim | G03G 15/50 399/167 |
| 2006/0029418 | A1 | 2/2006 | Ishii et al. | |
| 2006/0171736 | A1 | 8/2006 | Okamoto et al. | |
| 2008/0138105 | A1 | 6/2008 | Kanno et al. | |
| 2008/0138115 | A1 | 6/2008 | Chadani et al. | |
| 2008/0226352 | A1 | 9/2008 | Tanaka | |
| 2008/0232860 | A1 | 9/2008 | Sakata et al. | |
| 2008/0247784 | A1 | 10/2008 | Kakuta et al. | |
| 2008/0273901 | A1 | 11/2008 | Toyama et al. | |
| 2008/0298847 | A1 | 12/2008 | Inoue et al. | |
| 2009/0169255 | A1 | 7/2009 | Sato | |
| 2009/0297231 | A1 | 12/2009 | Aruga et al. | |
| 2009/0317134 | A1 | 12/2009 | Miyabe et al. | |
| 2010/0303503 | A1 | 12/2010 | Woo | |
| 2011/0158704 | A1 | 6/2011 | Takagi | |
| 2011/0222916 | A1 | 9/2011 | Sato | |
| 2011/0280621 | A1 | 11/2011 | Suzuki et al. | |
| 2012/0014730 | A1 | 1/2012 | Yoshizawa | |
| 2012/0063810 | A1 * | 3/2012 | Chadani | G03G 21/1821 399/111 |
| 2012/0177400 | A1 | 7/2012 | Jang et al. | |
| 2012/0195611 | A1 | 8/2012 | Adachi et al. | |
| 2012/0195634 | A1 | 8/2012 | Kuriki | |
| 2012/0237266 | A1 | 9/2012 | Miyazawa et al. | |
| 2013/0022376 | A1 | 1/2013 | Fujino et al. | |
| 2013/0108314 | A1 | 5/2013 | Ito et al. | |
| 2013/0108329 | A1 | 5/2013 | Yoshida | |
| 2013/0243498 | A1 | 9/2013 | Taniguchi et al. | |
| 2013/0287450 | A1 | 10/2013 | Hayashi et al. | |
| 2013/0287451 | A1 * | 10/2013 | Yamamoto | G03G 15/0806 399/281 |
| 2013/0287452 | A1 | 10/2013 | Yoshida et al. | |
| 2013/0308978 | A1 | 11/2013 | Nittani et al. | |
| 2013/0308988 | A1 | 11/2013 | Hirukawa et al. | |
| 2013/0330102 | A1 | 12/2013 | Kato | |
| 2014/0050503 | A1 | 2/2014 | Chadani et al. | |
| 2014/0147144 | A1 * | 5/2014 | Mitsui | G03G 15/0877 399/53 |
| 2014/0169829 | A1 | 6/2014 | Maeshima et al. | |
| 2014/0178097 | A1 | 6/2014 | Maeshima et al. | |
| 2015/0117906 | A1 | 4/2015 | Mori | |
| 2015/0125166 | A1 | 5/2015 | Matsukawa et al. | |
| 2015/0261122 | A1 * | 9/2015 | Hayashi | G03G 15/065 399/285 |
| 2015/0277370 | A1 | 10/2015 | Maeshima et al. | |
| 2016/0018784 | A1 | 1/2016 | Maeshima et al. | |
| 2016/0370747 | A1 | 12/2016 | Kawasaki et al. | |
| 2017/0160388 | A1 | 6/2017 | Chen et al. | |
| 2017/0285546 | A1 * | 10/2017 | Saito | G03G 15/5008 |
| 2019/0250546 | A1 * | 8/2019 | Araki | G03G 15/5025 |
| 2020/0096937 | A1 | 3/2020 | Maeshima et al. | |
| 2020/0150558 | A1 * | 5/2020 | Oka | G03G 15/0817 |
| 2021/0011429 | A1 | 1/2021 | Maeshima et al. | |

FOREIGN PATENT DOCUMENTS

| | | | |
|---|---|---|---|
| CN | 1577180 | A | 2/2005 |
| CN | 2687720 | Y | 3/2005 |
| CN | 101271303 | A | 9/2008 |
| CN | 101470383 | A | 7/2009 |
| CN | 101558361 | A | 10/2009 |
| CN | 102109797 | A | 6/2011 |
| CN | 102243470 | A | 11/2011 |
| EP | 1 345 089 | A1 | 9/2003 |
| EP | 2 075 638 | A | 7/2009 |
| JP | H04-181965 | A | 6/1992 |
| JP | H08-69180 | A | 3/1996 |
| JP | H09-325586 | A | 12/1997 |
| JP | H10-333409 | A | 12/1998 |
| JP | 2003-043819 | A | 2/2003 |
| JP | 2003-084571 | A | 3/2003 |
| JP | 2004-004380 | A | 1/2004 |
| JP | 2004-258324 | A | 9/2004 |
| JP | 2005-114159 | A | 4/2005 |
| JP | 2005-195883 | A | 7/2005 |
| JP | 2006-208689 | A | 8/2006 |
| JP | 2006-317718 | A | 11/2006 |
| JP | 2008-170951 | A | 7/2008 |
| JP | 2004-046215 | A | 4/2009 |
| JP | 2009-162906 | A | 7/2009 |
| JP | 2009-271415 | A | 11/2009 |
| JP | 2010-197479 | A | 9/2010 |
| JP | 2011-232498 | A | 11/2011 |
| JP | 2011-257653 | A | 12/2011 |
| JP | 2012-185524 | A | 9/2012 |
| JP | 2012-212185 | A | 11/2012 |
| KR | 960024752 | A | 7/1996 |
| KR | 20080069023 | A | 7/2008 |

(56) References Cited

FOREIGN PATENT DOCUMENTS

| | | | |
|---|---|---|---|
| KR | 10-2010-0037173 | A | 4/2010 |
| RU | 2 367 016 | C2 | 9/2009 |

OTHER PUBLICATIONS

International Search Report for International Patent Application No. PCT/JP2013/084174.
Examination Report in Canadian Patent Application No. 2,894,397, dated May 25, 2016.
Official Communication in European Patent Applicaiton No. 13862540.5, dated Jun. 17, 2016.
Sep. 8, 2016 Notice of Allowance in Russian Patent Application No. 2015128304 (with English translation).
Examination Report in Canadian Patent Application No. 2,894,397, dated Apr. 28, 2017.
Jun. 27, 2017 Office Action in Japanese Patent Application No. 2013-256647.
Decision on Grant in Russian Patent Application No. 2016152189, dated Jan. 29, 2018 (with English translation).
Examination Report in Canadian Patent Application No. 2,894,397, dated May 4, 2018.
Examination Report in Indian Patent Application No. 4086/CHENP/2015, dated Apr. 19, 2018.
Extended Search Report in European Patent Application No. 8 166 572.0, dated Aug. 28, 2018.
Nov. 1, 2018 Office Action in Chinese Patent Application No. 2010070338.8 (with English translation).
Decision to Grant in Russian Patent Application No. 2018111811, dated Nov. 16, 2018 (with English translation).
Decision to Grant in Russian Patent Application No. 2019100103 (with English translation).
Office Action in Japanese Patent Application No. 2018-153905, dated Jun. 8, 2019.
English translation of Jun. 18, 2019 Office Action in Japanese Patent Application No. 2018-153905.
English translation of Jun. 27, 2017 Office Action in Japanese Patent Application No. 2013-256647.
English translation of Feb. 10, 2014 Written Opinion of the International Searching Authority in International Patent Application No. PCT/JP2013/084174.
English translation of Japanese Patent Application Pub. No. 2010-197479.
English translation of Japanese Patent Application Pub. No. H09-325586.
English translation of Japanese Patent Application Pub. No. 2011-257653.
English translation of Japanese Patent Application Pub. No. 2011-232498.
English translation of Japanese Patent Application Pub. No. H04-181965.
Mar. 12, 2020 Office Action in European Patent Application No. 19 207 356.7.
Dec. 16, 2019 Search Report in Russian Patent Application No. 2019126775 (with English translation).
Jan. 24, 2020 Decision to Grant in Russian Patent Application No. 201912775 (with English translation).
Jan. 21, 2020 Office Action in Brazilian Patent Application No. BR112015013940-0 (with English translation).
Jun. 29, 2020 Decision to Grant in Russian Patent Application No. 2020112170 (with English translation).
Mar. 2, 2021 Decision to Grant in Russian Patent Application No. 2020131281 (with English translation).
Office Action dated Dec. 4, 2020, in counterpart Canadian Application No. 2,894,397.
Mar. 19, 2021 Office Action in Chinese Patent Application No. 201910357964.4 (with English translation).
Mar. 23, 2021 Office Action in Japanese Patent Application No. 2020-045509 A.
English translation of Mar. 23, 2021 Office Action in Japanese Patent Application No. 2020-045509.
Aug. 30, 2021 Canadian Official Action in Canadian Patent Appln. No. 2894397.
Jan. 6, 2022 Office Action in Chinese Patent Application No. 201910357964.4.
Jan. 24, 2022 Office Action in Chinese Patent Application No. 202010227037.3 (with English translation).
Dec. 22, 2021 Decision to Grant in Russian Patent Application No. 2021111596 (with English translation).
Feb. 28, 2022 Office Action in Indian Patent Application No. 201848038784.
Aug. 17, 2022 Office Action in Chinese Patent Application Pub. No. 202010227037.
Aug. 23, 2022 Extended Search Report in European Patent Application Pub. No. 22 17 733.3.
Information re Offer for Sale of Claimed Invention Before Dec. 14, 2012.
English translation of Japanese Patent Application Pub. No. 2004-004380.

* cited by examiner (a)

(b)

RANK
A : GOOD
B : TOLERABLE RANGE

| | PERIPHERAL SPEED DIFFERENCE | | | | | | | |
|---|---|---|---|---|---|---|---|---|
| | 1.2 | 1.3 | 1.4 | 1.5 | 1.6 | 1.7 | 1.8 | 1.9 |
| GHOST IMAGE DUE TO INSUFFICIENT PEELING | B | A | A | A | A | A | A | A |
| LATERAL STRIPE | A | A | A | A | A | A | A | B |
| POWER CONSUMPTION | S ←→ L | | | | | | | |

PROCESS CARTRIDGE AND IMAGE FORMING APPARATUS

TECHNICAL FIELD

The present invention relates to a process cartridge detachably mountable to an image forming apparatus and an image forming apparatus including the process cartridge. The image forming apparatus forms an image on a recording material using an image forming process. Examples of the image forming apparatus include a printer, a copying machine, a facsimile machine, or word processor and a multi-function combination of these machines.

BACKGROUND ART

Conventionally, in an image forming apparatus using an electrophotographic image forming process, a photosensitive drum and process parts actable on the photosensitive drum are not fixed to the apparatus, but rather are provided in a cartridge, for example, as a process cartridge that is detachably mountable to an apparatus main assembly of the image forming apparatus.

With this type of process cartridge, maintenance of the image forming apparatus can be performed by a user himself (herself). As a result, operation of the apparatus is improved, and, thus, process cartridges are widely used in image forming apparatuses.

In a full-color electrophotographic image forming apparatus using a transfer belt (intermediary transfer belt), a constitution is used in which a plurality of process cartridges are arranged below the transfer belt. This is because in the case in which a print is discharged onto an upper surface of the image forming apparatus, by positioning the process cartridges below the transfer belt, the time to a first printing can be shortened. As a process cartridge corresponding to this constitution, an arrangement is used in which a developing chamber is disposed at an upper portion close to the transfer belt and developer is scooped up, to the developing chamber, from a developer accommodating chamber positioned below the developing chamber (Japanese Laid-Open Patent Application 2008-170951).

In this process cartridge, by providing a stirring member in the developing chamber, circulation of the developer in the developing chamber is improved, so that the developer is efficiently supplied to the developing roller above the developing chamber so as to reduce an amount of residual developer.

However, in the constitution of Japanese Laid-Open Patent Application 2008-170951, there was a need to provide the stirring member in the developing chamber at a side below a contact portion between a developing roller and a developer supplying roller in the developing chamber. Therefore, the developer supplying roller for supplying the developer to the developing roller is rotated in a rotational direction opposite to rotational direction of the developing roller, so that circulation of the developer is made equivalent to or more than a conventional level without providing the stirring member in the developing chamber, and a supplying property of the developer from the developer supplying roller to the developing roller can be satisfied. According to this constitution, a space conventionally used for disposing the stirring member can be filled, and therefore residual developer can be further suppressed.

The present invention is a further development of the prior art structure.

SUMMARY OF THE INVENTION

Accordingly, it is an object of the present invention is to provide a process cartridge and an image forming apparatus in which in a constitution that a developer is scooped up from a developer accommodating chamber, provided below a developing chamber, to the developing chamber above the developer accommodating chamber, such that itis possible to realize reduction of residual developer while reducing the number of parts.

According to the present invention, there is provided process cartridge comprising: (i) a photosensitive drum; (ii) a rotatable developing roller for developing an electrostatic latent image formed on the photosensitive drum; (iii) a developer supplying roller, provided in contact with the developing roller, for supplying a developer to the developing roller; (iv) a driving force receiving portion for receiving a driving force, wherein the driving force receiving portion is provided at a shaft end portion of the developer supplying roller and is movable in a direction crossing a shaft of the developer supplying roller; (v) a first driving force transmitting portion for transmitting the driving force, received by the driving force receiving portion, to the developing roller, wherein the first driving force transmitting portion is provided on the developer supplying roller; and (vi) a second driving force transmitting portion, provided on the developing roller, for transmitting the driving force by engaging with the driving force transmitting portion. A rotational direction of the developing roller is an opposite direction to a rotational direction of the developer supplying roller, and a surface speed of the developer supplying roller is larger than a surface speed of the developing roller.

Further, according to the present invention, there is provided an image forming apparatus including a main assembly and a process cartridge, wherein: (i) the main assembly includes (i-i) a driving portion; and (ii) the process cartridge detachably mountable to the image forming apparatus includes: (ii-i) a photosensitive drum; (ii-ii) a developer supplying roller, provided in contact with a developing roller, for supplying a developer to the developing roller; (ii-iii) a developer supplying roller, provided in contact with the developing roller, for supplying the developer to the developing roller; (ii-iv) a driving force receiving portion for receiving a driving force by being connected with the driving portion, wherein the driving force receiving portion is provided at a shaft end portion of the developer supplying roller and is movable in a direction crossing a shaft of the developer supplying roller; (ii-v) a first driving force transmitting portion for transmitting the driving force, received by the driving force receiving portion, to the developing roller, wherein the first driving force transmitting portion is provided on the developer supplying roller; and (ii-vi) a second driving force transmitting portion, provided on the developing roller, for transmitting the driving force from the first driving force transmitting portion to the developing roller by engaging with the driving force transmitting portion. A rotational direction of the developing roller is opposite to a rotational direction of the developer supplying roller, and a surface speed of the developer supplying roller is larger than a surface speed of the developing roller.

EMBODIMENTS FOR CARRYING OUT THE PRESENT INVENTION

Hereinbelow, preferred embodiments of the present invention will be exemplarily and specifically described with reference to the drawings. However, dimensions, materials, shapes, relative arrangements and the like of constituent elements described in the following embodiments are appropriately changed depending on constitutions or various conditions of devices (apparatuses) to which the present invention is applied. Accordingly, the scope of the present invention is not limited thereto unless otherwise specified.

In the following, an image forming apparatus according to an embodiment of the present invention and a process cartridge used therein will be described in accordance with the drawings.

(General Structure of Image Forming Apparatus)

Figure 2:
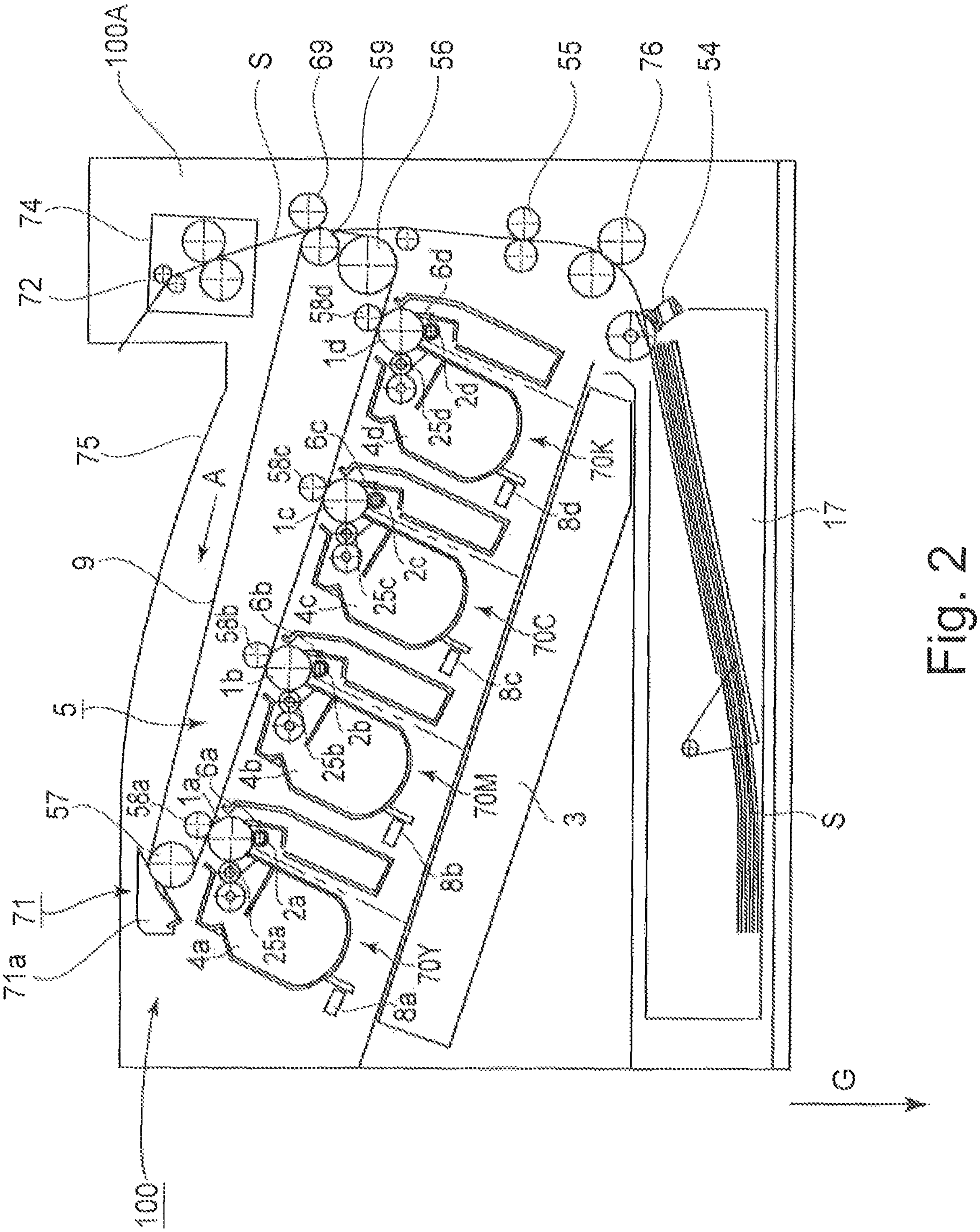
FIG. 2 is a principal sectional view of an image forming apparatus in the embodiment of the present invention.

First, a general structure of an electrophotographic image forming apparatus (hereinafter referred to as an "image forming apparatus") 100 will be described using FIG. 2. As shown in FIG. 2, detachably mountable four process cartridges 70 (70Y, 70M, 70C, 70K) are detachably mounted by mounting members (unshown). Further, an upstream side of the process cartridge 70 with respect to a mounting direction to the image forming apparatus 100 is defined as a front (surface) side, and a downstream side of the process cartridge 70 with respect to the mounting direction is defined as a rear (surface) side. In FIG. 2, the respective process cartridges 70 are inclined and juxtaposed in an apparatus main assembly 100A with respect to a horizontal direction ht.

The process cartridge 70 includes electrophotographic photosensitive drums (hereinafter referred to as "photosensitive drums") 1 (1*a*, 1*b*, 1*c*, 1*d*), and at a periphery of the photosensitive drums 1, process means such as charging rollers 2 (2*a*, 2*b*, 2*c*, 2*d*), developing rollers 25 (25*a*, 25*b*, 25*c*, 25*d*), and cleaning members 6 (6*a*, 6*b*, 6*c*, 6*d*) are integrally provided.

The charging roller 2 electrically charges the surface of the photosensitive drum 1 uniformly, and the developing roller 25 develops a latent image, formed on the photosensitive drum 1, with toner to visualize the latent image. The cleaning member 6 removes the toner remaining on the photosensitive drum 1 after a toner image formed on the photosensitive drum 1 is transferred onto a recording material (medium).

Further, below the process cartridges 70, a scanner unit 3 is provided for forming the latent image on the photosensitive drums 1 by subjecting the photosensitive drums 1 to selective exposure to light on the basis of image information.

At a lower portion of the apparatus main assembly 100A, a cassette 17 is mounted in which sheets of the recording material S are accommodated. Further, a recording material feeding portion is provided so that the recording material S can be fed to an upper portion of the apparatus main assembly 100A by being passed through a secondary transfer roller 69 and a fixing portion 74. That is, a feeding roller 54 for separating and feeding the sheets of the recording material S in the cassette 17 in a one-by-one manner, a feeding roller pair 76 for feeding the fed recording material S, and a registration roller pair 55 for synchronizing the latent image formed on the photosensitive drum 1 with the recording material S are provided.

Further, above the process cartridges 70 (70Y, 70M, 70C, 70K), an intermediary transfer unit 5 is provided as an intermediary transfer means onto which the toner image formed on each of the photosensitive drums 1 (1*a*, 1*b*, 1*c*, 1*d*) is to be transferred. The intermediary transfer unit 5 includes a driving roller 56, a follower roller 57, primary transfer rollers 58 (58*a*, 58*b*, 58*c*, 58*d*) at positions opposing the photosensitive drums 1 for the respective colors, and an opposite roller 59 at a position opposing the secondary transfer roller 69. Around these rollers, a transfer belt (intermediary transfer belt) 9 is extended and stretched.

Further, the transfer belt 9 is circulated and moved so as to oppose and be contacted to all of the photosensitive drums 1, so that primary transfer (of the toner images) from the photosensitive drums 1 onto the transfer belt 9 is made by applying a voltage to the primary transfer rollers 58 (58*a*, 58*b*, 58*c*, 58*d*). Then, by voltage application to the secondary transfer roller 69 and the opposite roller 59 disposed inside the transfer belt 9, the toner images are transferred from the transfer belt 9 onto the recording material S.

During image formation, while rotating each of the photosensitive drums 1, the photosensitive drum 1 uniformly charged by the charging roller 2 is subjected to selective exposure to light emitted from the scanner unit 3. By this, an electrostatic latent image is formed on the photosensitive drum 1. The latent image is developed by the developing roller 25. By this, the toner images of the respective colors are formed on the photosensitive drums 1, respectively. In synchronism with this image formation, the registration roller pair 55 feeds the recording material S to a secondary transfer position where the secondary transfer roller 69 opposing the opposite roller 59 is contacted to the transfer belt 9.

Then, by applying a transfer bias voltage to the secondary transfer roller 69, the respective color toner images are secondary-transferred from the transfer belt 9 onto the recording material S. By this, a color image is formed on the recording material S. The recording material S on which the color image is formed is heated and pressed by the fixing portion 74, so that the toner images are fixed on the recording material S. Thereafter, the recording material S is discharged onto a discharge portion 75 by a sheet-discharging roller pair 72. The fixing portion 74 is disposed at an upper portion of the apparatus main assembly 100A.

(Process Cartridge)

Next, the process cartridge 70 in this embodiment will be described with reference to FIGS. 3 to 5.

Figure 3:
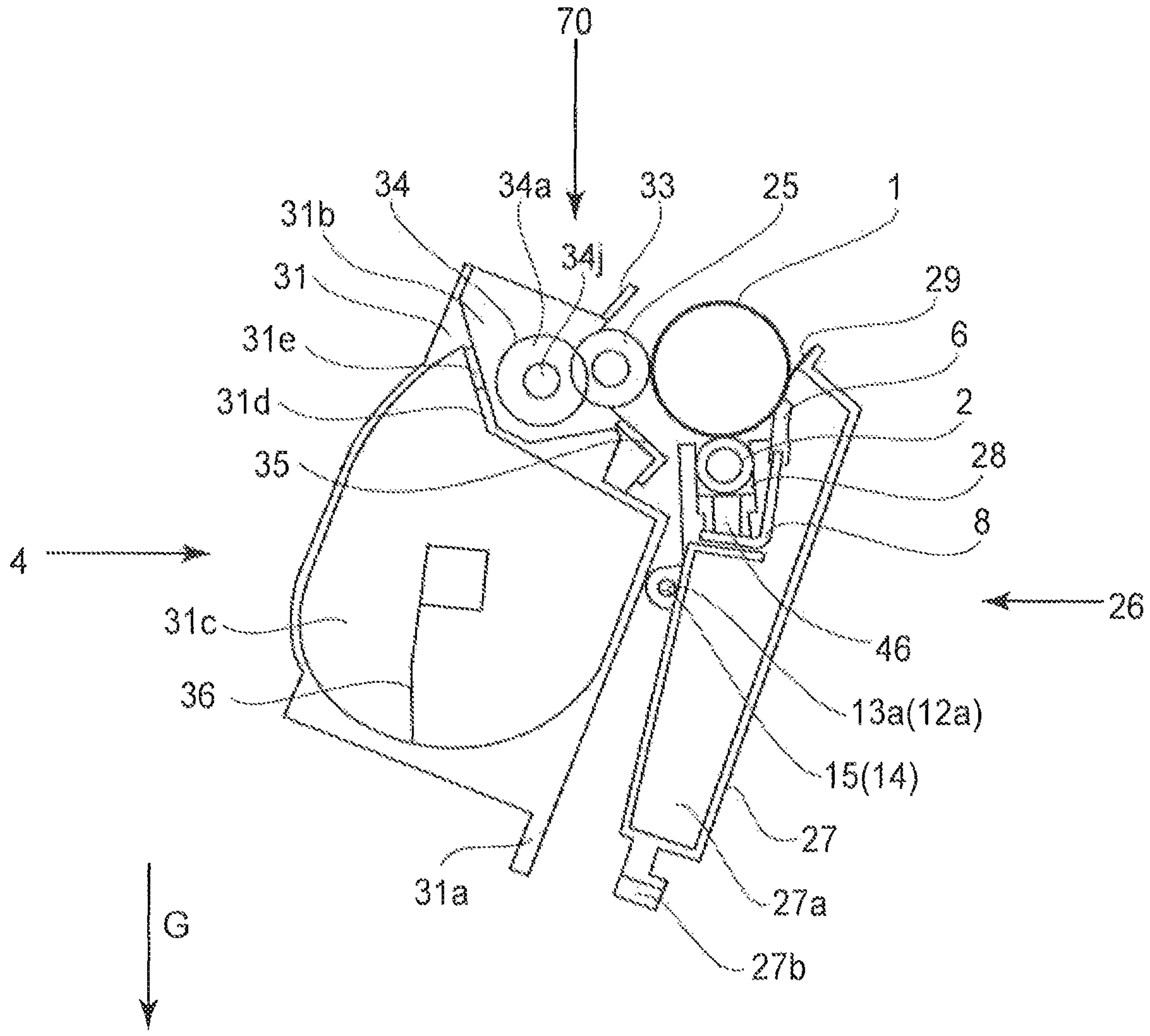
FIG. 3 is a principal sectional view of a process cartridge in the embodiment of the present invention.

FIG. 3 is a principal sectional view of the process cartridge 70 in which the toner is accommodated. Incidentally, the process cartridge 70Y accommodating the toner of yellow, the process cartridge 70M accommodating the toner of magenta, the process cartridge 70C accommodating the toner of cyan, and the process cartridge 70K accommodating the toner of black have the same constitution.

The respective process cartridges 70 (70Y, 70M, 70C, 70K) include drum units 26 (26*a*, 26*b*, 26*c*, 26*d*) as a first unit and developing units 4 (4*a*, 4*b*, 4*c*, 4*d*) as a second unit. The drum unit 26 includes the photosensitive drum 1 (1*a*, 1*b*, 1*c*, 1*d*), the charging roller 2 (2*a*, 2*b*, 2*c*, 2*d*) and the cleaning member 6 (6*a*, 6*b*, 6*c*, 6*d*). Further, the developing unit 4 includes the developing roller 25.

To a cleaning frame 27 of the drum unit 26, the photosensitive drum 1 is rotatably mounted via a front drum bearing 10 and a rear drum bearing 11. The photosensitive drum 1 is provided with a drum coupling 16 and a flange 19 at an end portion thereof.

On a circumferential surface of the photosensitive drum 1, as described above, the charging roller 2 and the cleaning member 6 are disposed. The cleaning member 6 is constituted by an elastic member formed with a rubber blade and a cleaning supporting member 8. A free end portion of the elastic member is disposed in contact with the photosensitive drum 1 counter directionally to a rotational direction of the photosensitive drum 1. Further, residual toner removed from the surface of the photosensitive drum 1 by the cleaning member 6 falls into a removed toner chamber 27*a*. Still further, a receptor sheet 29 for preventing leakage of the removed toner in the removed toner chamber 27*a* is contacted to the photosensitive drum 1.

By transmitting a driving force of a main assembly driving motor (not shown) as a driving source to the drum unit 26, the photosensitive drum 1 is rotationally driven in an image forming operation. The charging roller 2 is rotatably mounted to the drum unit 26 via a charging roller bearing 28 and is urged against the photosensitive drum 1 by a charging roller urging member 46, thus being rotated by the rotation of the photosensitive drum 1.

The developing unit 4 includes the developing roller 26, rotating in contact with the photosensitive drum 1 in an arrow B direction, and a developing device frame 31 for supporting the developing roller 25. Further, the developing unit 4 is constituted by a developing chamber 31*b* in which the developing roller 25 is disposed and by a toner accommodating portion 31*c*, disposed below the developing chamber 31*b* with respect to the direction of gravity in a state in which the process cartridge is mounted in the image forming apparatus, as a developer accommodating container for accommodating the toner. These chambers (portions) are partitioned by a partition wall 31*d*. The toner accommodating portion 31 is positioned below the developing roller 25 and the developer supplying roller with respect to the direction of gravity. Further, the partition wall 31*d* is provided with an opening 31*e* through which the toner passes when the toner is fed from the toner accommodating portion 31*c* to the developing chamber 31*b*. The developing roller 25 is rotatably supported by the developing (device) frame 31 via a front developing (means) bearing 12 and a rear developing (means) bearing 13 provided in both sides of the developing device frame 31, respectively (FIG. 3).

Further, a developer supplying roller 34 rotatable in contact with the developing roller 25 in an arrow E direction, and a developing blade 35 for regulating a toner layer on the developing roller 25 are provided to a peripheral surface of the developing roller 25.

The developer supplying roller 34 is constituted by a metal-made developer supplying roller shaft 34*j* and a sponge portion 34*a* that is an elastic portion for covering an outer peripheral surface of the shaft in an exposed state at end portions. The developer supplying roller 34 is disposed so that the sponge portion 34*a* is contacted to the developing roller 25 with a predetermined penetration amount into the developing roller 25. Further, a leakage-out preventing sheet 33 is provided as a developing (means) contact sheet for preventing the toner from leaking out of the developing frame 31 by contacting the developing roller 25.

Further, in the toner accommodating portion 31*c* in the developing frame 31, a toner feeding member 36 is provided a feeding means for feeding the toner into the developing chamber 31*b* through the opening 31*e* while stirring the toner accommodated in the toner accommodating chamber 31*c*.

As described above, the toner accommodating portion 31*c* is provided below the developing chamber 31*b* with respect to the direction of gravity, and the toner feeding member 36 is therefore also positioned below the developing chamber 31*b* with respect to the direction of gravity. That is, the developing cartridge 70 in this embodiment has a toner scooping-up constitution in which the toner is fed by the toner feeding member 36 against gravity from the toner accommodating portion 31*c* disposed at a lower position to the developing chamber 31*b* disposed at an upper position of the toner accommodating portion 31*c*.

Figure 4:
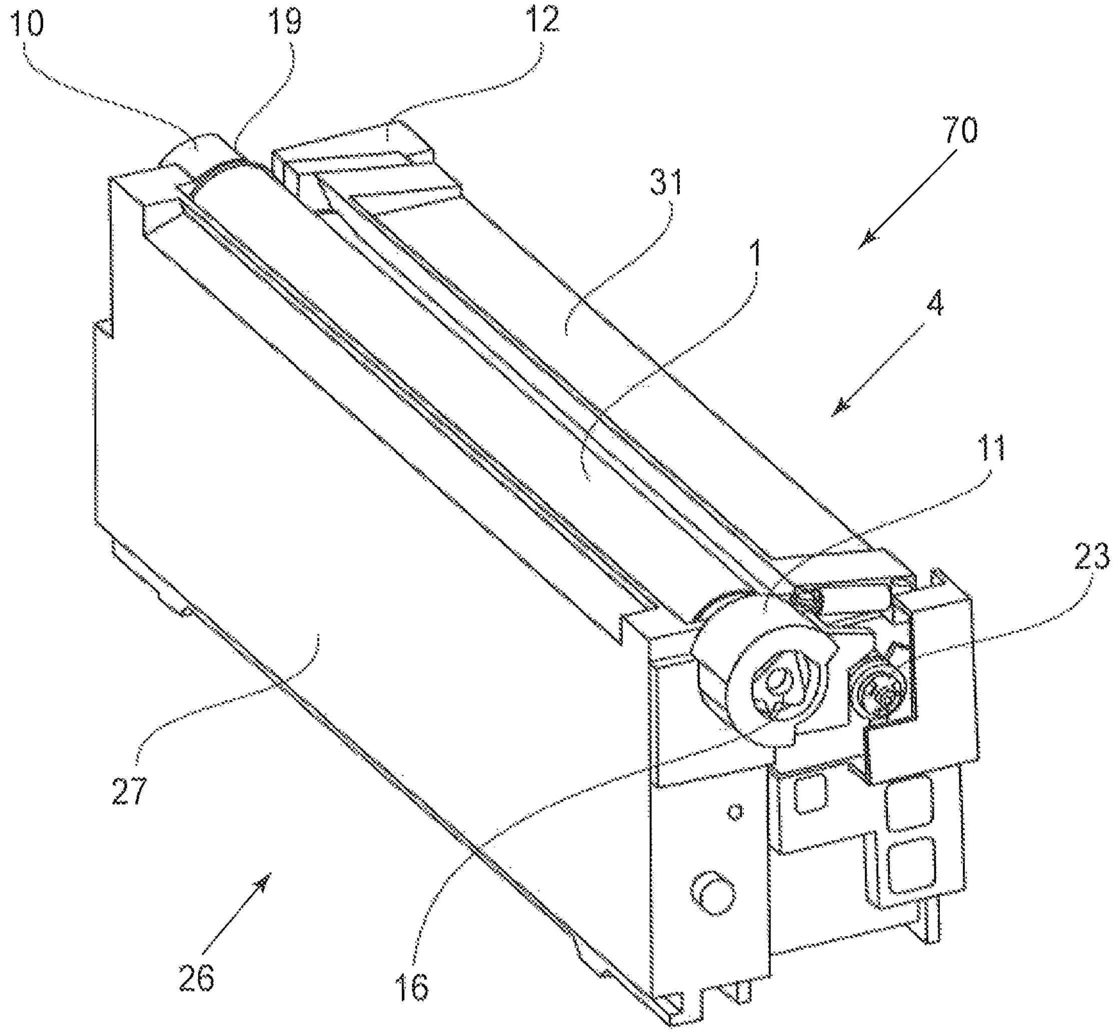
FIG. 4 is a general perspective view of the process cartridge in the embodiment of the present invention.
Figure 5:
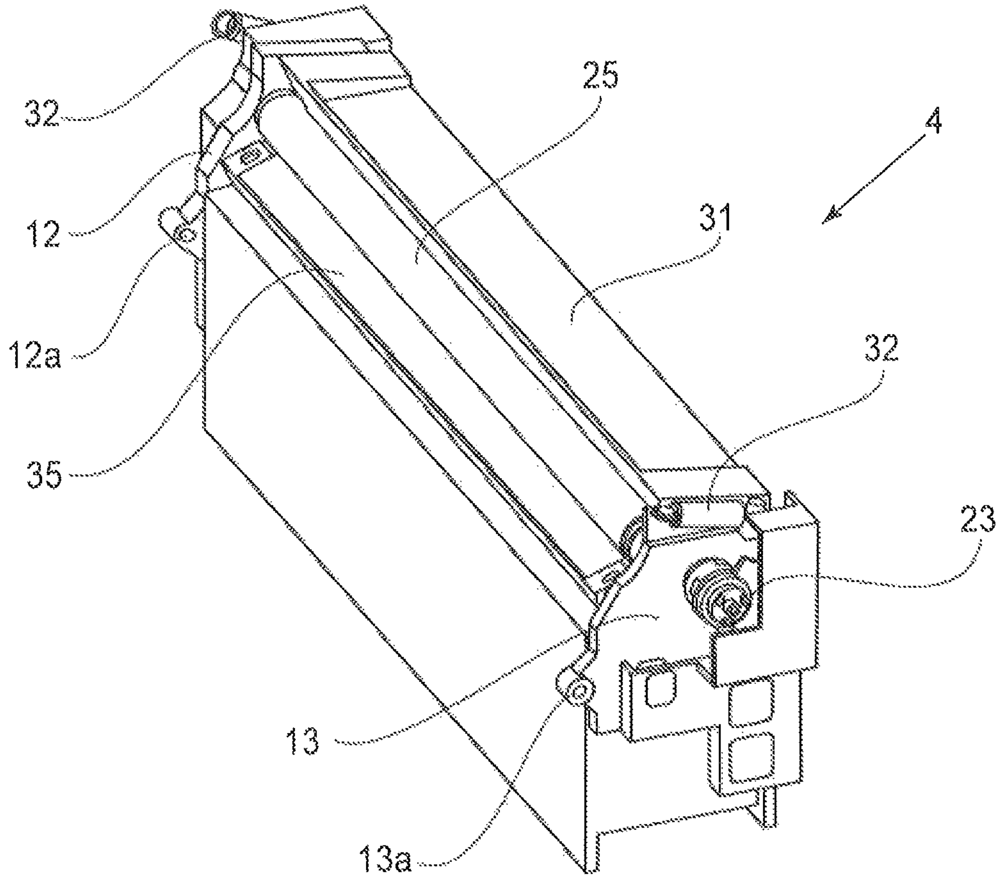
FIG. 5 is a general perspective view of the developing unit in the embodiment of the present invention.

FIG. 4 is a general perspective view of the process cartridge 70. FIG. 5 is a general perspective view of the developing unit 4. To the drum unit 26, the developing unit 4 is rotatably mounted. A front supporting pin 14 and a rear supporting pin 15, which are press-fitted in the cleaning frame 27, are engaged with hang holes 12*a* and 13*a*, respectively, of the rear developing bearing 13. As a result, the developing unit 4 is rotatably supported by the cleaning frame 27 with the front supporting pin 14 and the rear supporting pin 15 as rotation shafts.

Further, the cleaning frame 27 is provided with a front drum bearing 10 and a rear drum bearing 11 which rotatably support the photosensitive drum 1. The rear drum bearing 11 supports a drum coupling 16 coupled to the photosensitive drum 1. Further, the front drum bearing 10 supports the flange 19. Here, the drum coupling 16 is a drum coupling member for transmitting a rotational driving force (first rotational driving force) from the apparatus main assembly 100A to the photosensitive drum 1.

The developing frame 31 is provided with the front and rear developing bearings 12 and 13 for rotatably supporting the developing roller 25. Further, the developing unit 4 is constituted so as to be urged against the drum unit 26, during image formation of the process cartridge 70, by an urging spring 32 provided at each of ends of the developing frame 31. By these urging springs 32, an urging force for bringing the developing roller 25 into contact with the photosensitive drum 1 is generated with, as rotation centers, the hang holes 12*a* and 13*a* of the front and rear developing bearings 12 and 13.

(Insertion and Mounting Constitution of Process Cartridge into Image Forming Apparatus Main Assembly)

Figure 6:
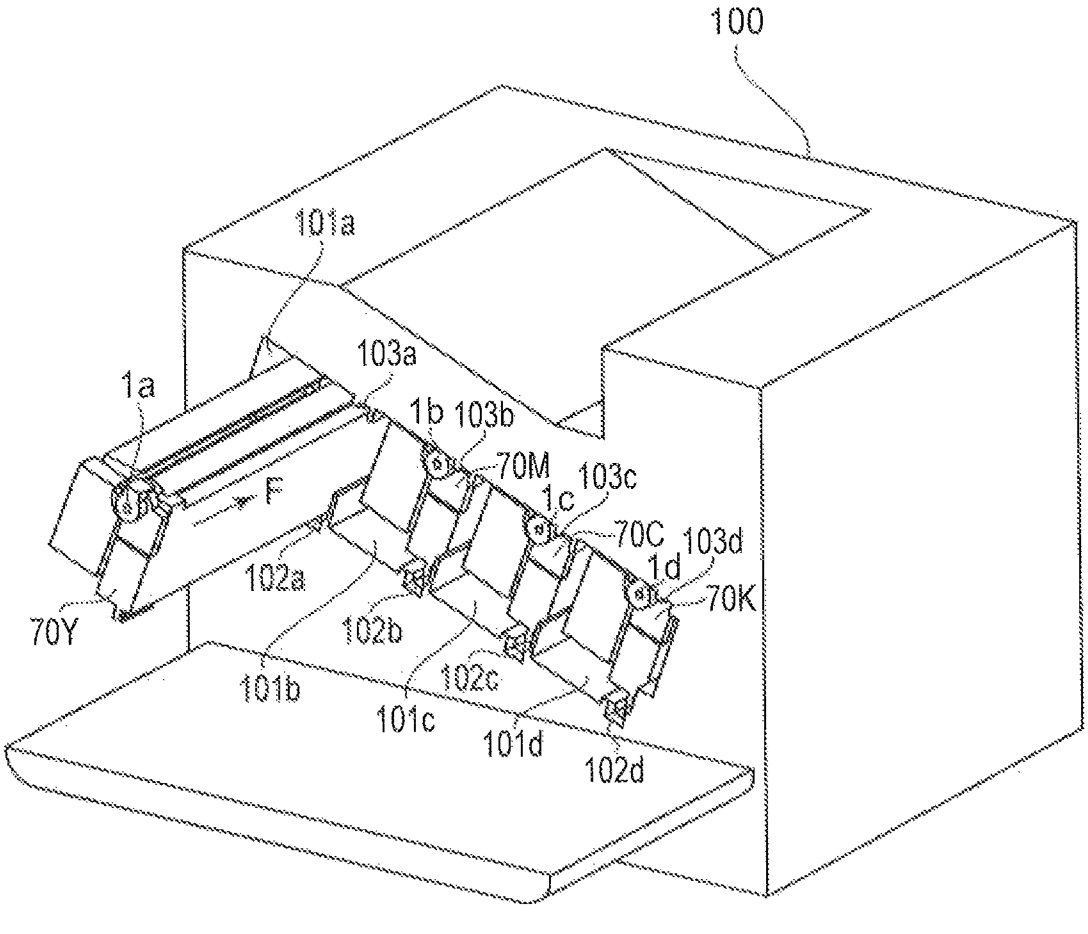
FIG. 6 is a schematic view of mounting of a process cartridge in the image forming apparatus in the embodiment of the present invention.

With reference to FIG. 6, a constitution in which the process cartridge 70 is inserted into the image forming apparatus 100 will be described. In this embodiment, a constitution in which the process cartridges 70 (70Y, 70M, 70C, 70K) are inserted through openings 101 (101*a*, 101*b*, 101*c*, 101*d*) of the image forming apparatus 100 is such that the process cartridges 70 are inserted from the front side to the rear side in a direction (arrow F direction in the figure) parallel to an axial direction of the photosensitive drums 1 (1*a*, 1*b*, 1*c*, 1*d*).

In this embodiment, with respect to an insertion direction of the process cartridge 70, an upstream side is defined as a front side, and a downstream side is defined as a rear side. Further, in the image forming apparatus 100, main assembly upper mounting guide portions 103 (103*a*, 103*b*, 103*c*, 103*d*), which are first main assembly guide portions, are provided in an upper side. Further, in the image forming apparatus 100, main assembly lower mounting guide portions 102 (102*a*, 102*b*, 102*c*, 102*d*), which are second main assembly mounting guide portions, are provided in a lower side. Each of the main assembly upper guide portions 103 and the main assembly lower guide portions 102 has a guide shape extending along an insertion direction F of each of the process cartridge 70.

The process cartridge 70 is placed in a front side of the main assembly lower mounting guide portion 102 with respect to a mounting direction and then is moved in the insertion direction F along the main assembly upper and lower mounting guide portions 102 and 103, thus being inserted into the image forming apparatus 100.

Figure 7:
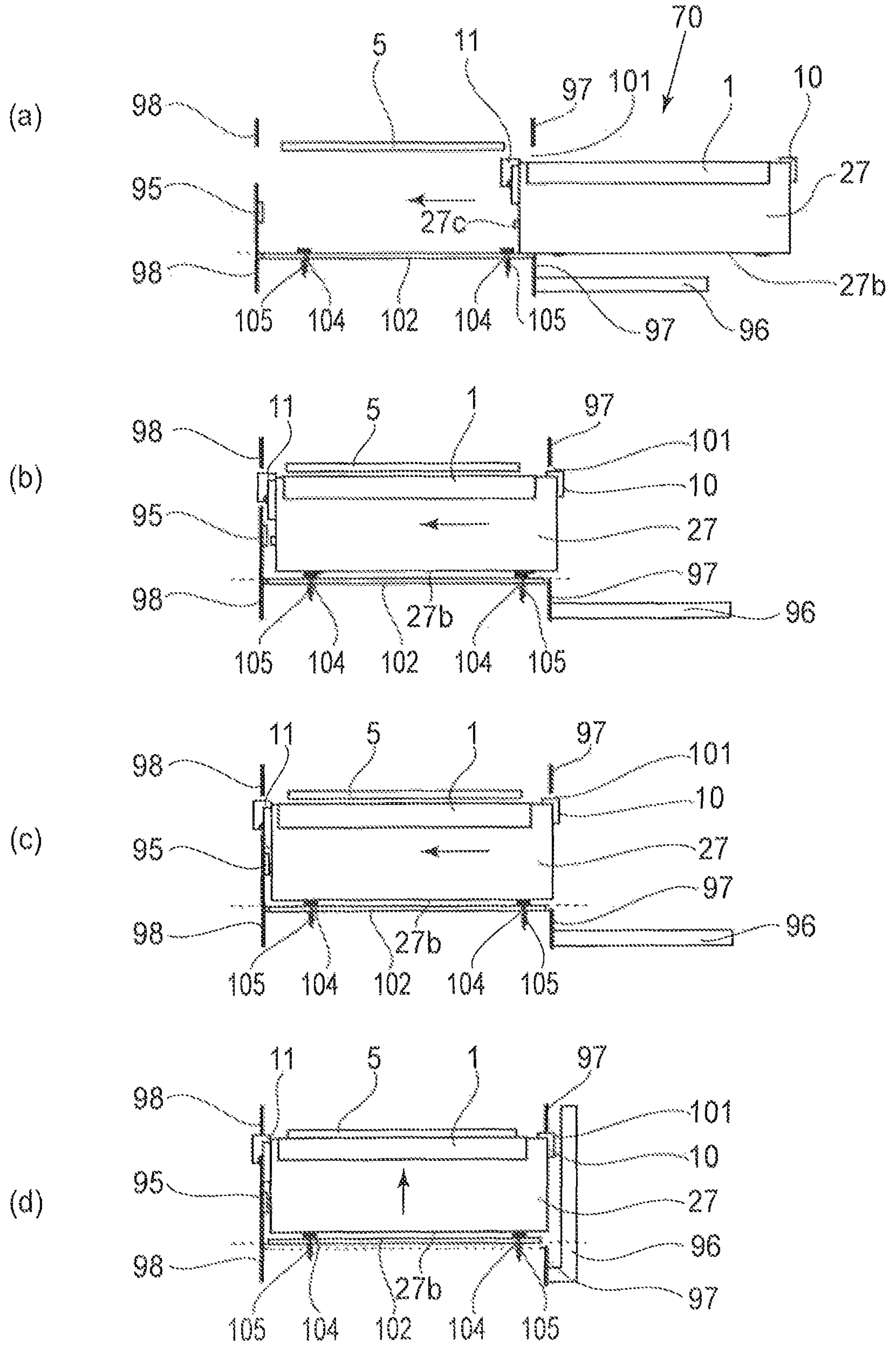
In FIG. 7, (*a*)-(*d*) are schematic views for illustrating an operation of mounting the process cartridge in an image forming apparatus main assembly in the embodiment of the present invention.

An operation of mounting the process cartridge 70 into the apparatus main assembly 100A will be described. FIG. 7(*a*) is a schematic view for illustrating a state before mounting of the process cartridge 70 into the apparatus main assembly 100A.

FIG. 7(*b*) is a schematic view for illustrating a state during the mounting of the process cartridge 70 into the apparatus main assembly 100A. The main assembly lower mounting guide portion 102 in the apparatus main assembly 100A is provided with a main assembly side pressing member 104 and a main assembly side pressing spring 105 which press and position the process cartridge 70 against the apparatus main assembly. When the process cartridge 70 is mounted in the apparatus main assembly 100A, a guide portion 27*b* of the cleaning frame 27 runs on the main assembly pressing portion 104 such that the process cartridge 70 moves in an upward direction. Then, the guide portion 27*b* of the cleaning frame 27 is in a state in which the guide portion 27*b* is spaced from a guide surface of the main assembly lower mounting guide portion 102.

FIG. 7(*c*) is a schematic view for illustrating a state in which the process cartridge 70 is mounted into the apparatus main assembly 100A to when the process cartridge 70 abuts against a rear side plate 98. From the state in which the guide portion 27*b* of the cleaning frame 27 runs on the main assembly pressing member 104, when the mounting of the process cartridge 7 is continued, a longitudinal abutting portion provided on the rear drum bearing 11 contacts the rear plate 98 of the apparatus main assembly 100A.

Figure 8:
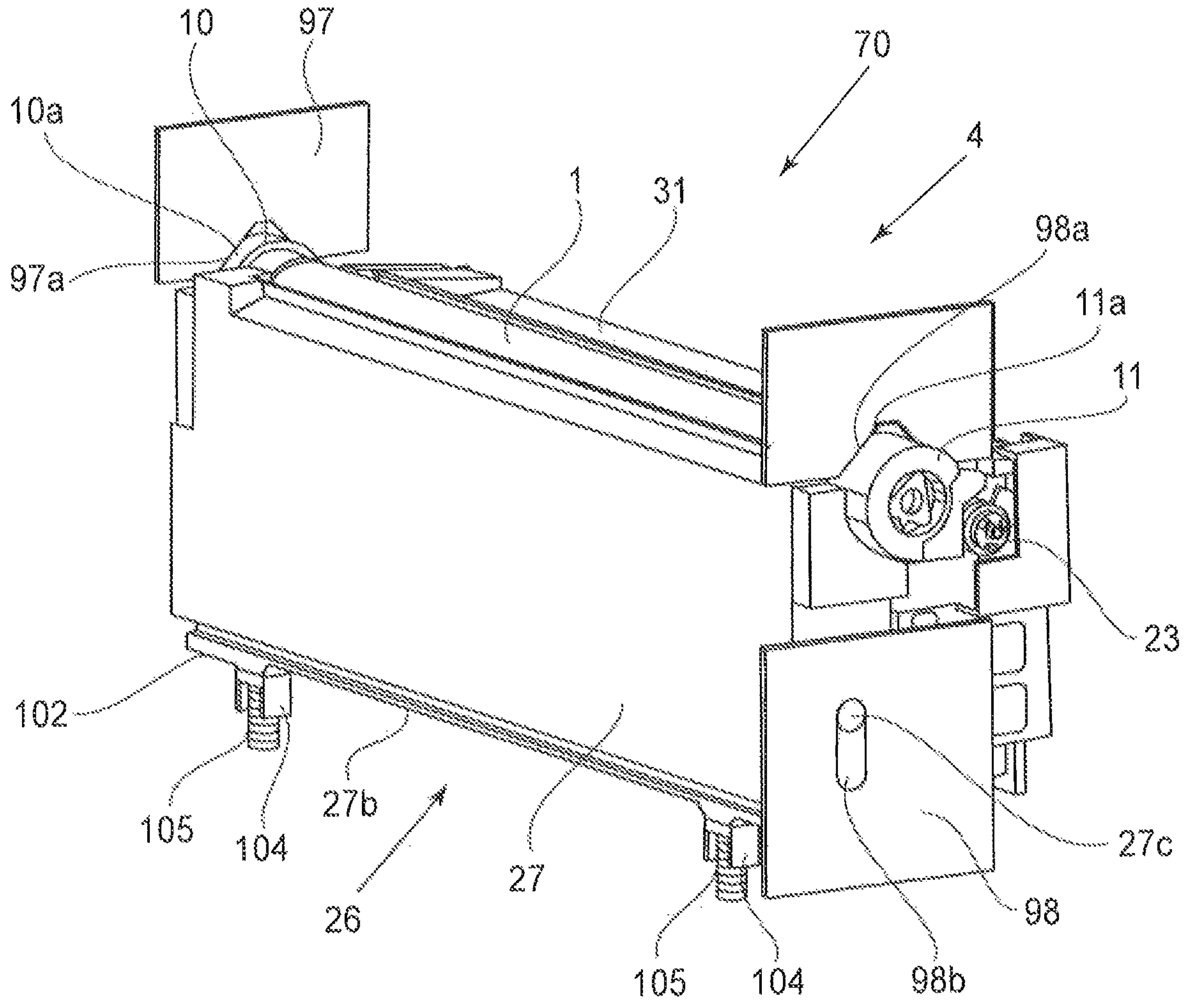
FIG. 8 is a perspective view showing a state in which the process cartridge is positioned to the image forming apparatus main assembly in the embodiment of the present invention.

FIG. 7(*d*) and FIG. 8 are schematic views for illustrating a state in which the process cartridge 70 is positioned relative to the apparatus main assembly 100A. In a state of (c) of FIG. 7, in interrelation with closing of a front door 96 of the apparatus main assembly 100A, the main assembly lower mounting guide portion 102 including the main assembly pressing member 104 and the main assembly pressing spring 105 moves in the upward direction. With the movement, the process cartridge 70 contacts a main assembly side positioning portion 98*a* of the rear plate 98 at a cartridge side positioning portion 11*a* provided at an upper portion of the rear drum bearing 11.

Then, by the contact of the cartridge positioning portion 10*a* provided at the upper portion of the rear drum bearing 10 with the main assembly positioning portion 97*a* that is a main assembly side positioning portion of a front plate 97, the position of the process cartridge 70 relative to the apparatus main assembly 100A is determined. Also in this state, the guide portion 27*b* of the cleaning frame 27 is spaced from the guide surface of the main assembly lower mounting guide portion 102 such that the process cartridge 70 is pressed by a spring force of the main assembly pressing spring 105 received from the main assembly pressing member 104.

Further, the cleaning frame 27 is provided on a side surface thereof with a boss 27*c* as a rotation stopper for the process cartridge 70, and the boss 27*c* engages with a rotation preventing hole (portion) 98*b* provided in the rear plate 98. Thus, the process cartridge 70 is prevented from rotating in the apparatus main assembly 100A.

(Spacing Mechanism Between Photosensitive Drum and Developing Roller in Process Cartridge)

In the process cartridge 70 according to this embodiment, the photosensitive drum 1 and the developing roller 25 are capable of being contacted to and spaced from each other. Here, a spacing mechanism between the photosensitive drum 1 and the developing roller 25 will be described with reference to FIGS. 9 and 10.

Figure 9:
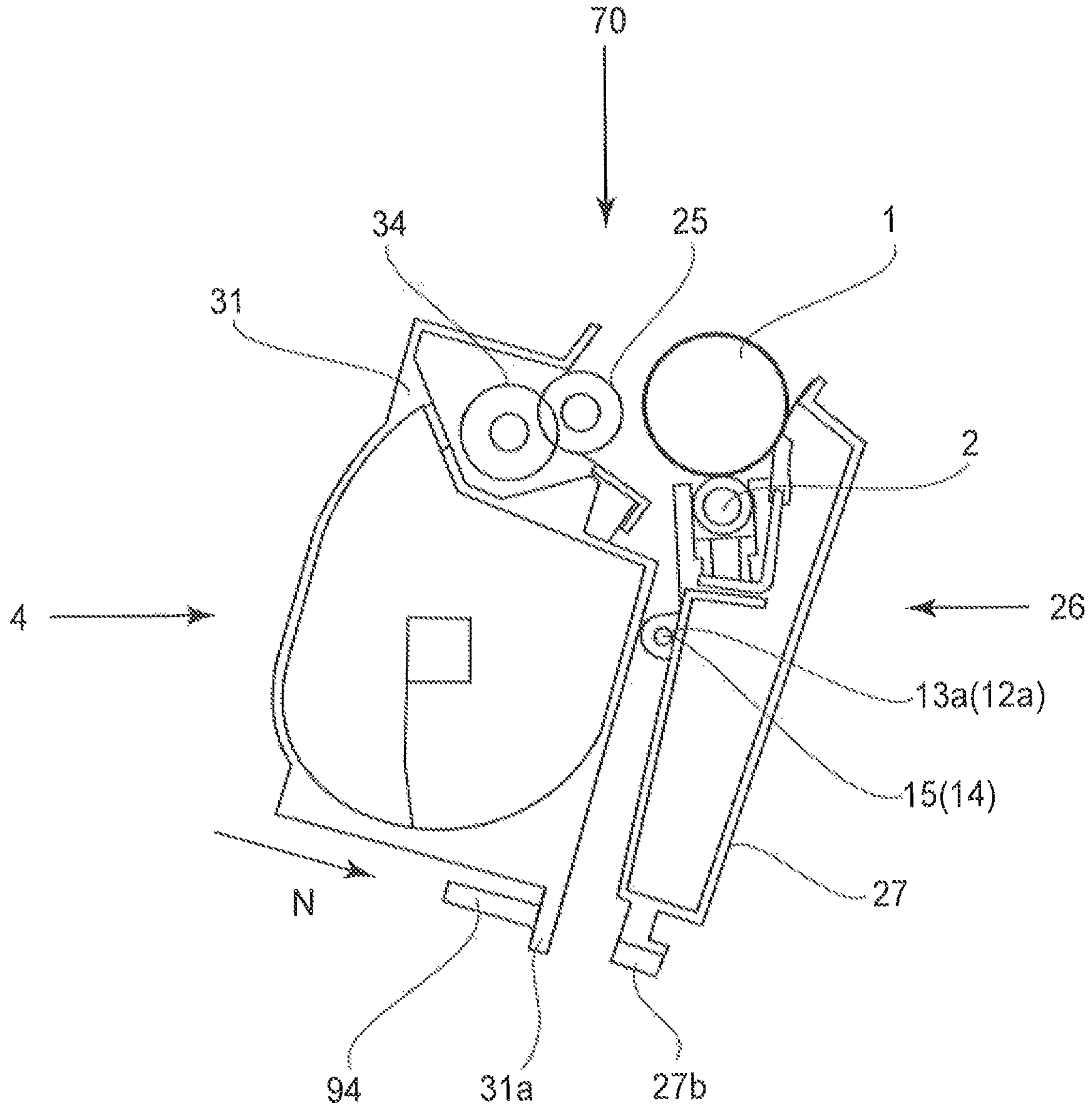
FIG. 9 is a sectional view for illustrating a spacing operation of the developing unit in the embodiment of the present invention.

In FIG. 9, the apparatus main assembly is provided with a spacing member 94 at a predetermined position with respect to a longitudinal direction of the process cartridge 70. In the developing unit 4 of the process cartridge 70, a spacing force receiving portion 31*a* of the developing frame 31 receives a force from the spacing member 94 moving in an arrow N direction, thus moving the developing roller 25 to a spaced position where the developing roller 25 is spaced from the photosensitive drum 1.

Figure 10:
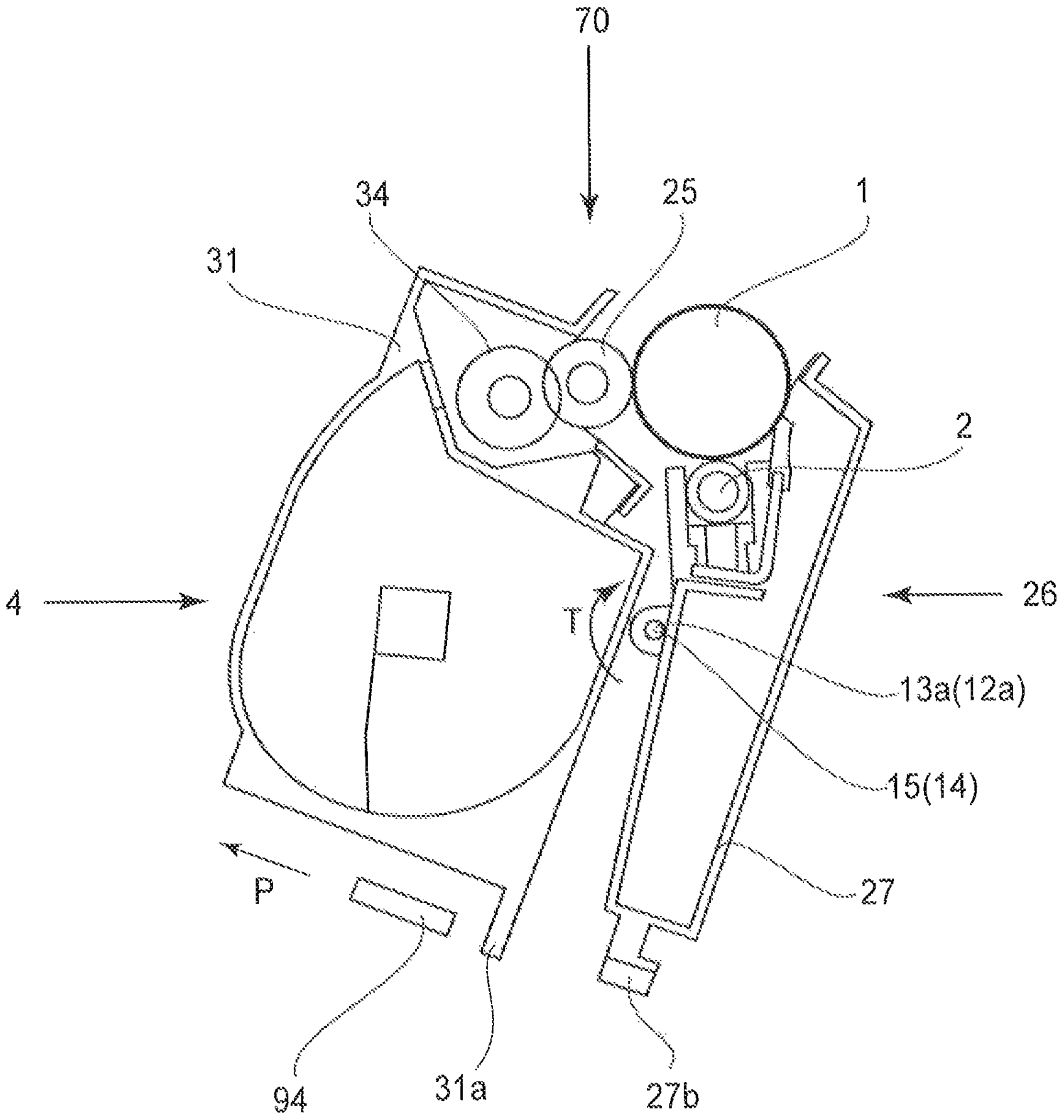
FIG. 10 is a sectional view for illustrating a contact operation of the developing unit in the embodiment of the present invention.

Further, as shown in FIG. 10, when the spacing member 94 moves in an arrow P direction away from the spacing force receiving portion 31*a*, the developing unit 4 is rotated in an arrow T direction about the holes 12*a* and 13*a* of the front and rear developing bearings 12 and 13 by the urging force of the urging springs 32 (FIG. 5) provided at the ends of the developing frame 31. Then, the developing unit 4 is moved to a contact position, so that the developing roller 25 and the photosensitive drum 1 are in contact with each other. At least during the image formation, the developing unit 4 is held at a contact position of FIG. 9. Then, at a time set in advance, such as during stand-by from image formation, the developing unit 4 is held at the spaced position of FIG. 9. As such, deformation of the developing roller 25 is suppressed, which has an effect on image quality.

(Spacing Mechanism when Process Cartridge is Mounted)

Figure 11:
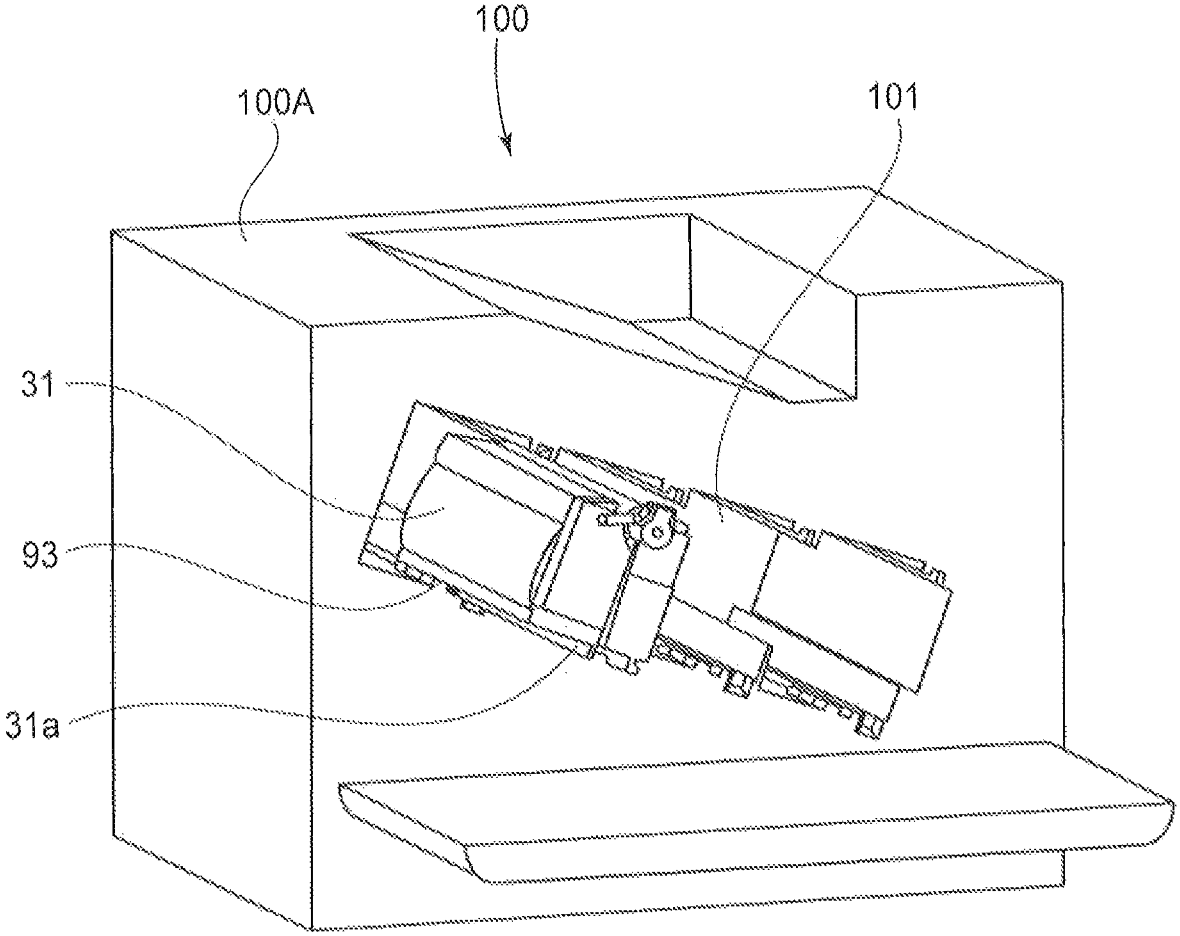
FIG. 11 is a perspective view before the process cartridge is mounted in the image forming apparatus main assembly in the embodiment of the present invention.
Figure 12:
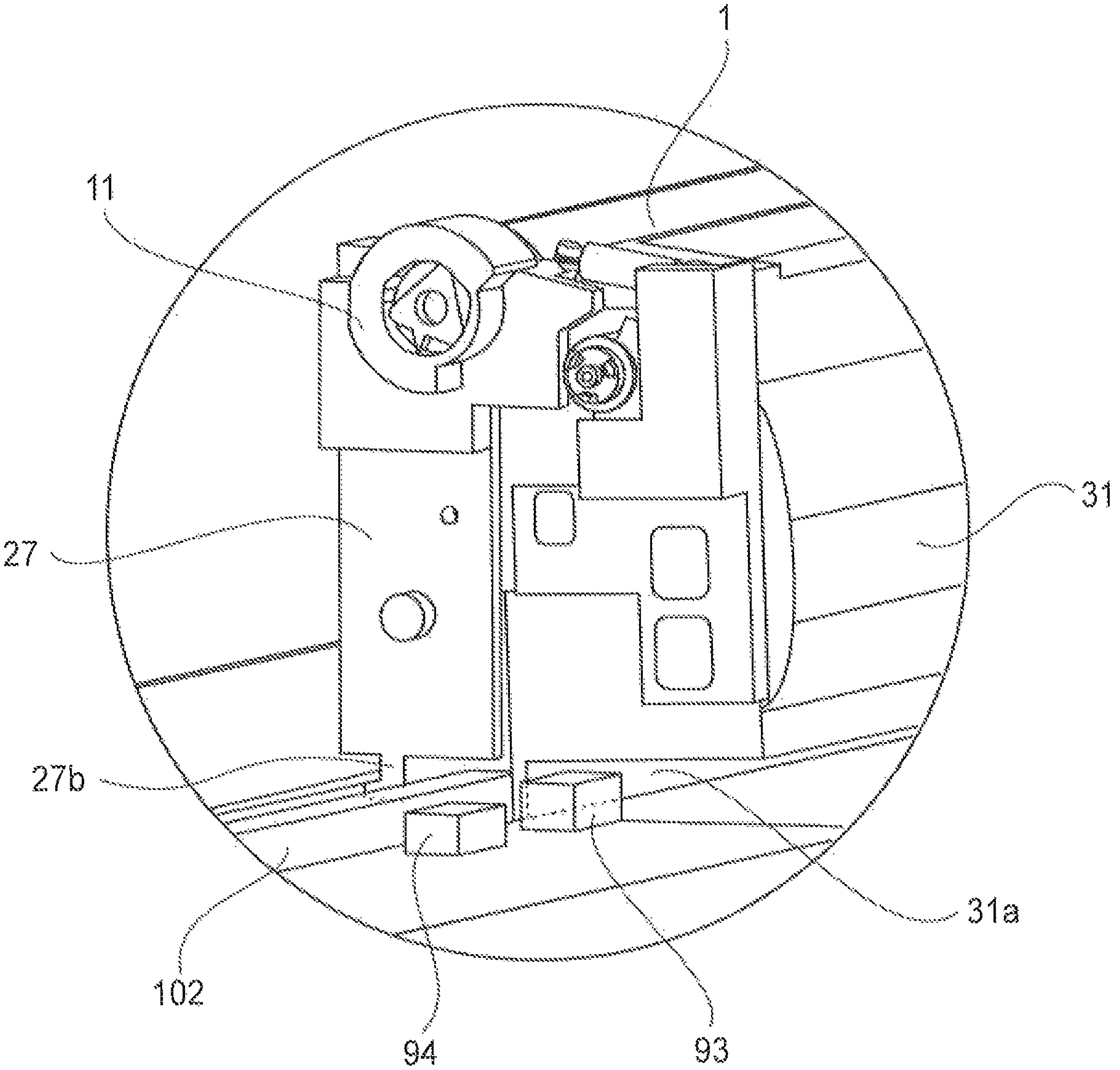
FIG. 12 is a perspective view of mounting of the process cartridge in the image forming apparatus main assembly in the embodiment of the present invention.

A spacing mechanism when the process cartridge 70 is mounted in the apparatus main assembly 100A will be described using FIGS. 11 and 12.

When the process cartridge 70 is mounted in the apparatus main assembly 100A, the developing unit 4 is in the contact position, and the photosensitive drum 1 and the developing roller 25 are in contact with each other. At the completion of the mounting of the process cartridge 70 in the apparatus main assembly 100A and at the end of the image forming operation of the image forming apparatus 100, the developing unit 4 is in the spaced position, and the photosensitive drum 1 and the developing roller 25 are spaced from each other.

Therefore, when the process cartridge 70 is mounted in the apparatus main assembly 100A, there is a need to move the process cartridge 70 from the contact position to the spaced position, and a constitution thereof will be described using FIGS. 11-14. As shown in FIG. 11, the apparatus main assembly 100A is provided with an image forming apparatus opening 101 for permitting mounting of the process cartridge 70. Further, as shown in FIGS. 11 and 12, the apparatus main assembly 100A is provided with a spacing guide portion 93 contacting a spacing force receiving portion 31*a* provided on the developing unit 4 of the process cartridge 70.

Figure 13:
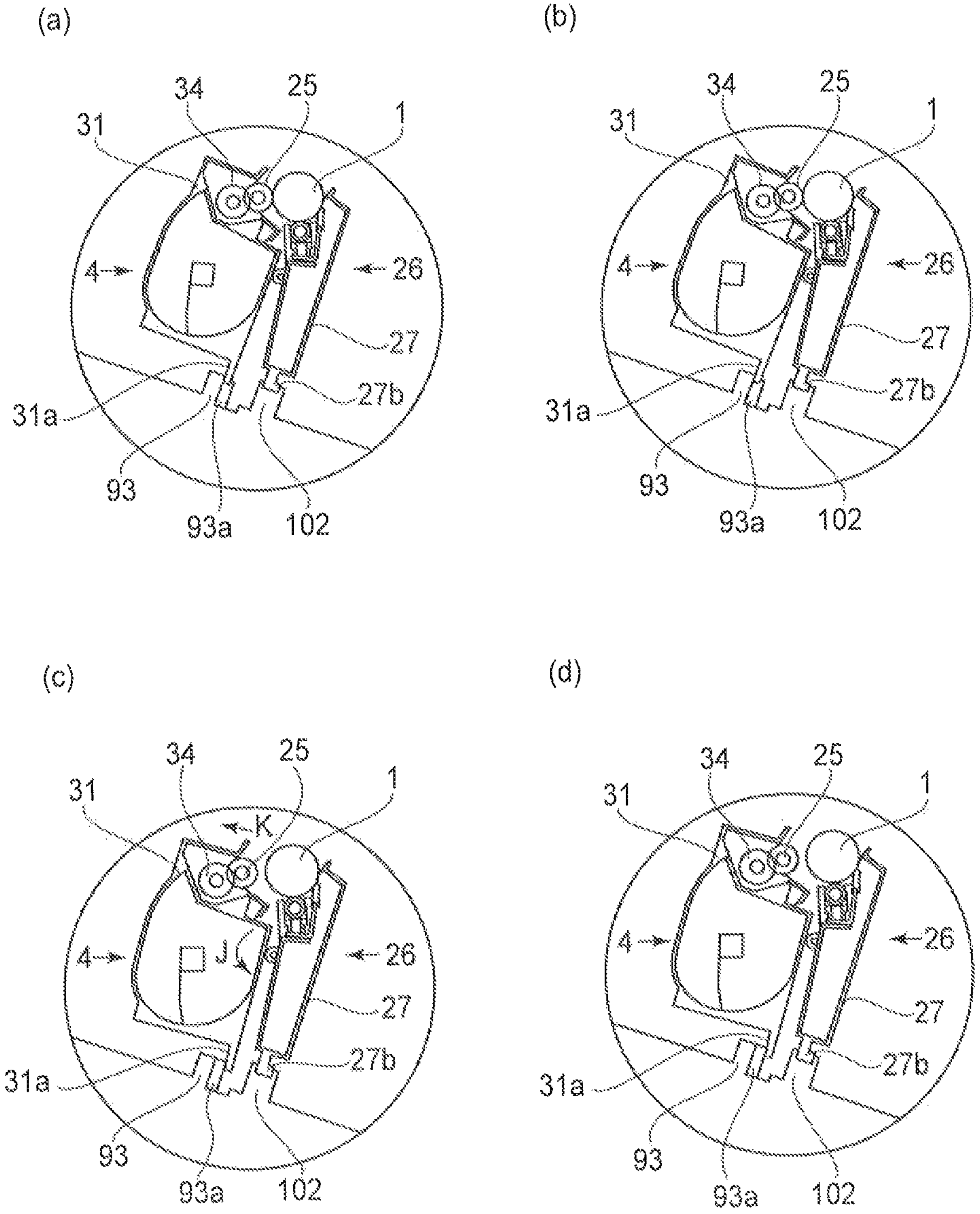
FIG. 13 includes schematic views in which an operation of mounting the process cartridge in the image forming apparatus main assembly is viewed from an apparatus main assembly front side in the embodiment of the present invention.
Figure 14:
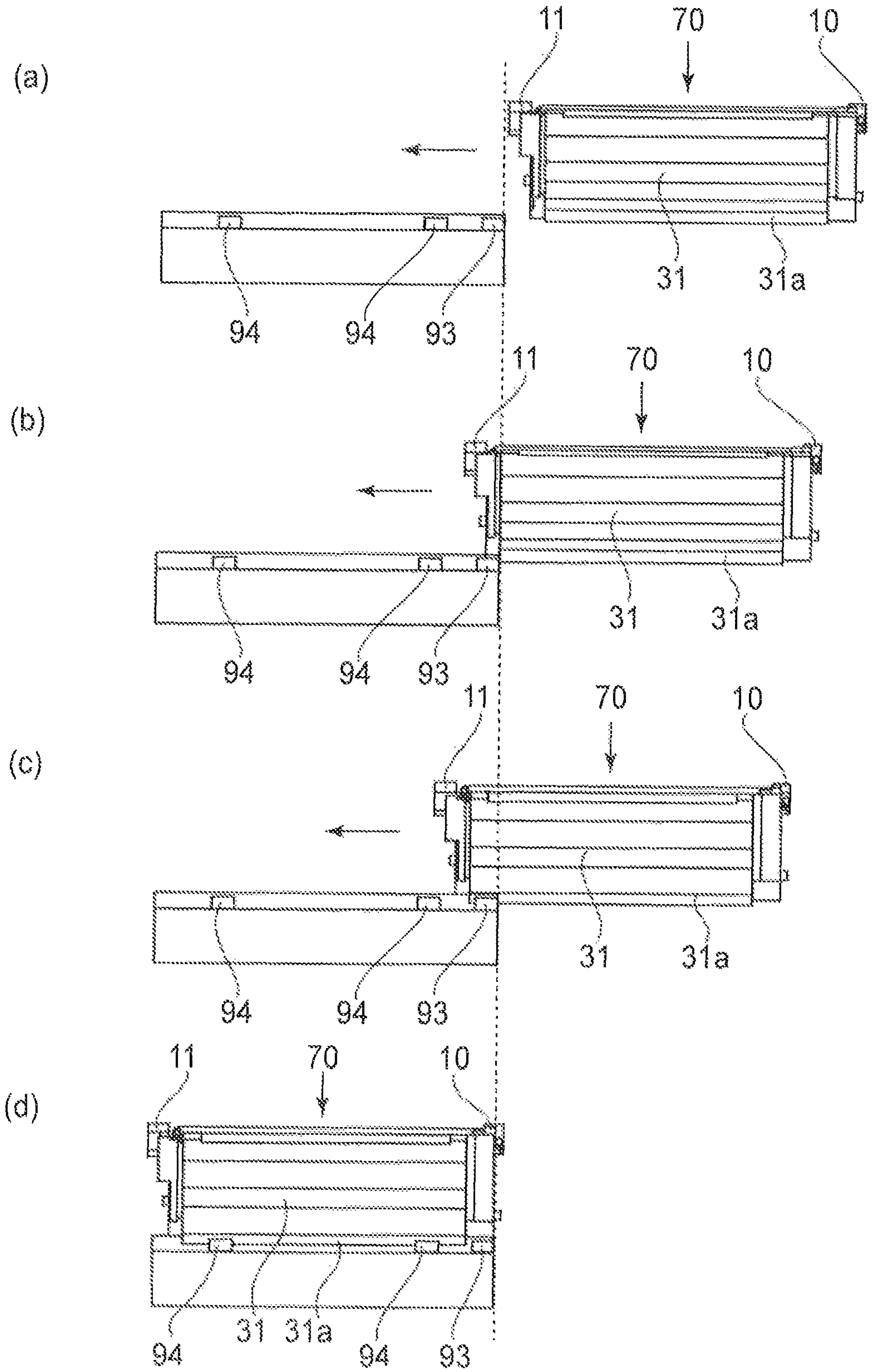
FIG. 14 includes schematic views in which the position of mounting the process cartridge in the image forming apparatus main assembly is viewed from an apparatus main assembly side surface side in the embodiment of the present invention.

As shown in (a) of FIG. 13 and (a) of FIG. 14, before the process cartridge 70 enters the apparatus main assembly 100A, the developing unit 4 is in the contact position, and the photosensitive drum 1 and the developing roller 25 are in contact with each other. Then, as shown in (b) of FIG. 13 and (b) of FIG. 14, when the process cartridge 70 is mounted into the apparatus main assembly 100A, first, the guide portion 27*b* provided integrally with the cleaning frame 27 is mounted on the main assembly lower mounting guide portion 102 provided in the apparatus main assembly 100A. Then, the spacing force receiving portion 31*a* provided on the developing frame 31 contacts a chamfered portion 93*a*, which is an inclined surface obliquely inclined relative to the spacing guide portion 93.

When the process cartridge 70 is caused to further enter the apparatus main assembly, as shown in (c) of FIG. 13 and (c) of FIG. 14, the developing unit 4 rotates in an arrow J direction about a rear supporting pin 15 as a rotation center. Then, the developing unit 4 moves in an arrow K direction to the spaced position. Then, when the process cartridge 70 is positioned in the apparatus main assembly 100A, as shown in (d) of FIG. 13 and (d) of FIG. 14, the spacing force receiving portion 31*a* is in a contact state with the spacing member 94 disposed downstream of the spacing guide portion 93 with respect to the mounting direction. At that time, the developing unit 4 is in the spaced position such that the process cartridge 70 can be mounted in the apparatus main assembly 100A while keeping the developing roller 25 in the spaced state from the photosensitive drum 1.

(Constitution of Developer Supplying Roller Supporting and Developing (Means) Driving Force Inputting Portion in Process Cartridge)

Next, a constitution of a developing driving force inputting portion and a supporting constitution of the developer supplying roller 34 in the process cartridge 70 according to this embodiment will be described using FIGS. 15-18.

Figure 15:
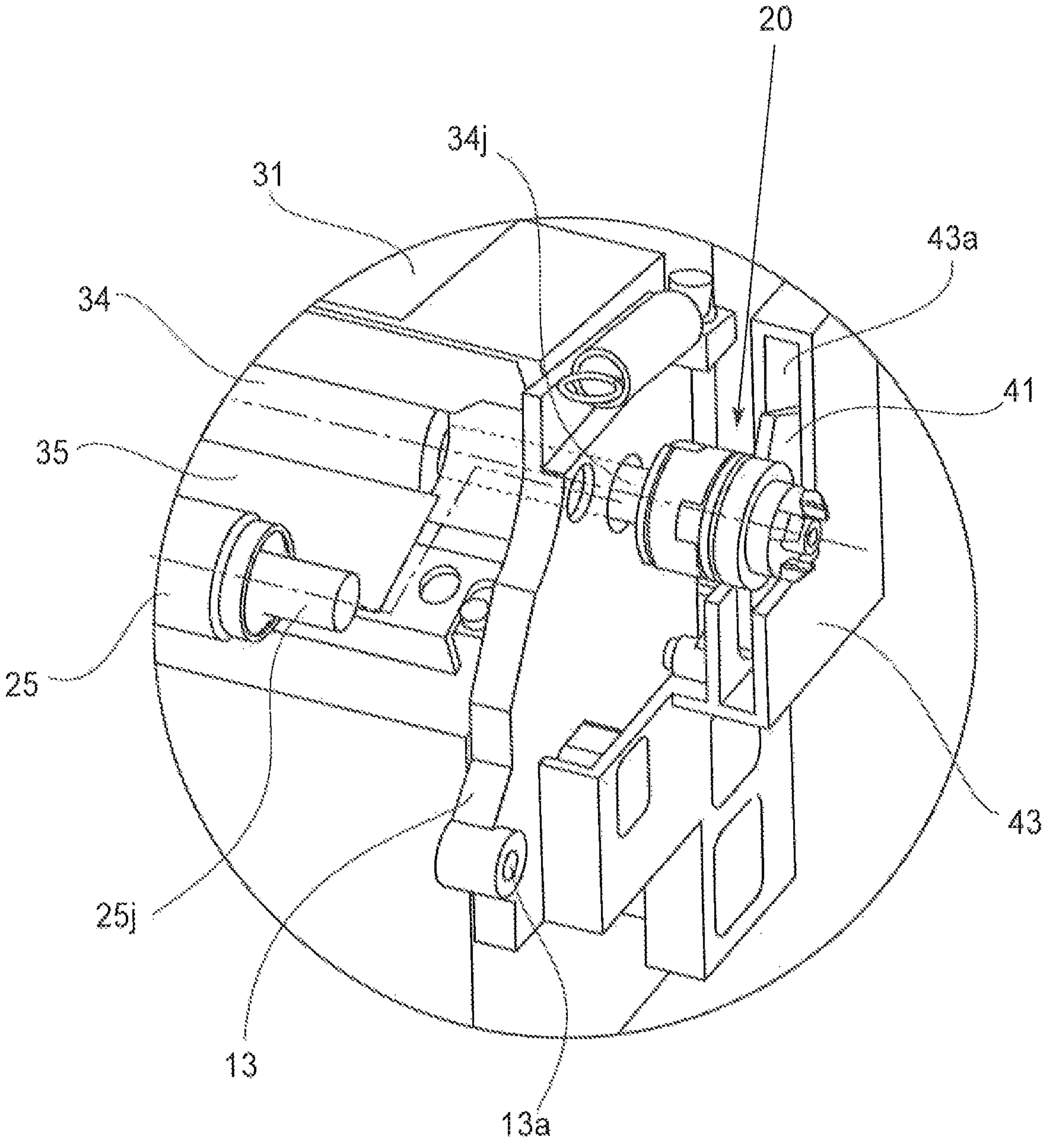
FIG. 15 is a perspective view for illustrating a supporting constitution for a toner supplying roller and a developing roller in the embodiment of the present invention.

FIG. 15 is an illustration showing a longitudinal one end side (rear side) of a supporting portion for the developing roller 25 and the developer supplying roller 34. In FIG. 15, a developing roller shaft 25*j* of the developing roller 25 and a developer supplying roller shaft 34*j* of the developer supplying roller 34 are rotatably engaged with an inner peripheral surface of the rear developing bearing 13. Here, the supporting constitution in the longitudinal one end side of the developing roller 25 and the developer supplying roller 34 is described. But, similarly, at the other longitudinal end side the bearing portion is integrally provided with the bearing member, and the developing roller shaft 25*j* and the developer supplying roller shaft 34*j* are rotatably engaged. Further, at the developing driving force inputting portion, an Oldham coupling 20 is used a shaft coupling member.

Figure 16:
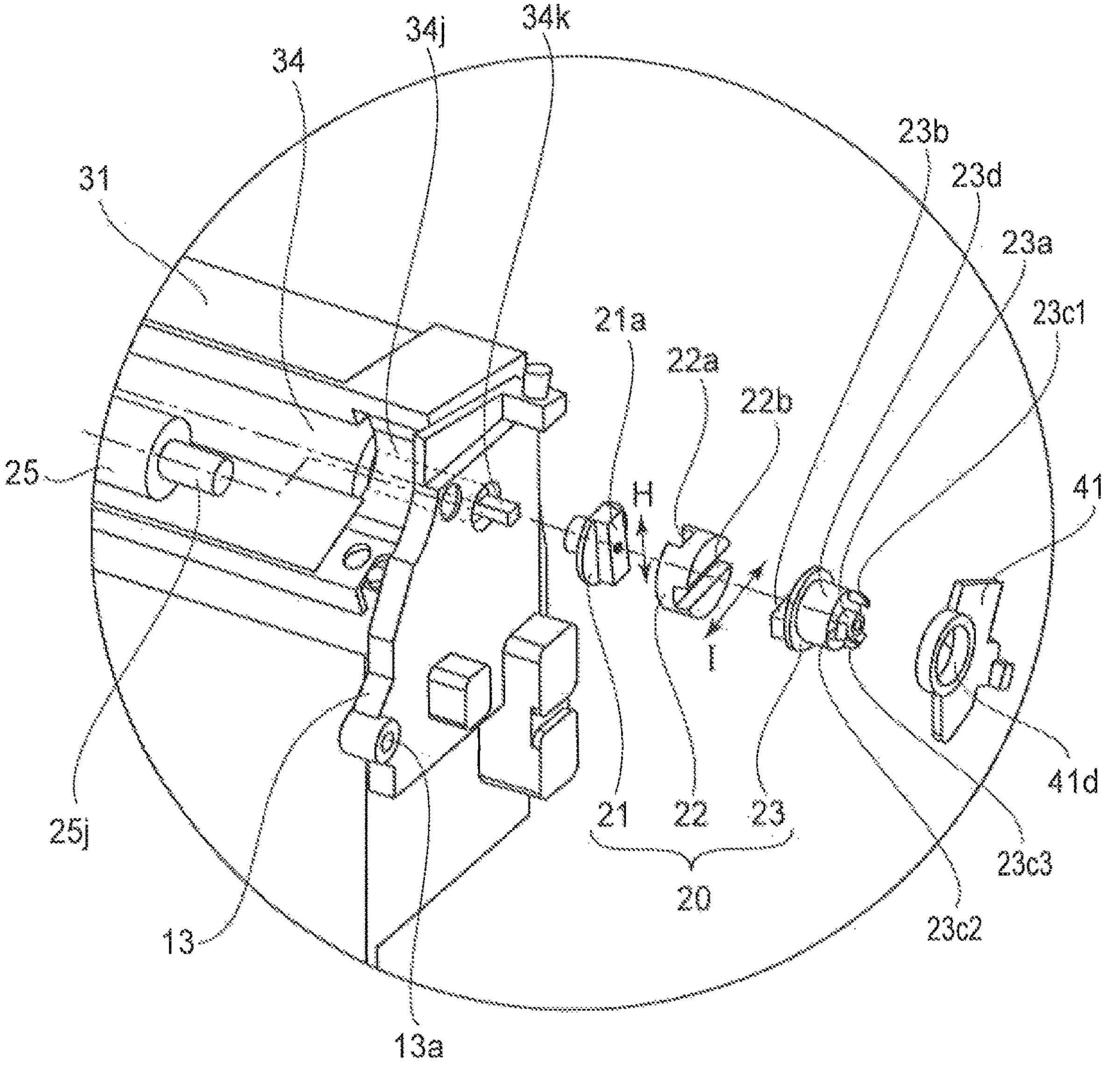
FIG. 16 is an exploded illustration of a shaft coupling member in the embodiment of the present invention.

Using FIG. 16, a constitution of the Oldham coupling 20 will be described. Here, in order to describe the constitution of the Oldham coupling 20, the rear developing bearing 13 is not shown. As shown in FIG. 16, the Oldham coupling 20 is constituted by a follower-side engaging portion 21 which is a driven portion, an intermediary engaging portion which is an intermediary portion, and a driving-side engaging portion 23 which is a drive receiving portion.

The follower-side engaging portion 21 is fixed and mounted to an end portion (at one end side with respect to an axial direction) of the developer supplying roller shaft 34*j*. One fixing method is a connection made by a spring pin or a parallel pin. In another method, which as shown in FIG. 16, the developer supplying roller shaft 34*j* is provided with a cut portion 34*k* at an end surface thereof, and a hole in the follower-side engaging portion 21 side is similarly shaped and is engaged with the cut portion 34*k*.

The driving-side engaging portion 23 (first drive receiving portion) is a portion for receiving a driving force of a driving source of the main assembly. Further, in this embodiment, an H direction and an I direction are in a substantially perpendicular relationship. A shaft portion 23*d* of the driving-side engaging portion 23 is rotatably held in a hole 41*d* of a holding portion 41. Further, the driving-side engaging portion 23 is integrally formed with three projections 23*c*1, 23*c*2 and 23*c*3 engageable with a main assembly side developing (means) coupling 91 (FIG. 18), which is a second main assembly side drive transmitting member of the 100A (described below).

This Oldham coupling 20 allows a deviation between an axis of the main assembly developing coupling 91 and an axis of the developer supplying roller 34, and transmits a rotational driving force (first rotational driving force) from the apparatus main assembly 100A to the developer supplying roller 34. Further, the Oldham coupling 20 is capable of transmitting a rotational driving force (second rotational driving force) from the apparatus main assembly 100A to the developer supplying roller 34 when the developing unit 4 is in the contact position and when the developing unit 4 is in the spaced position.

Figure 17:
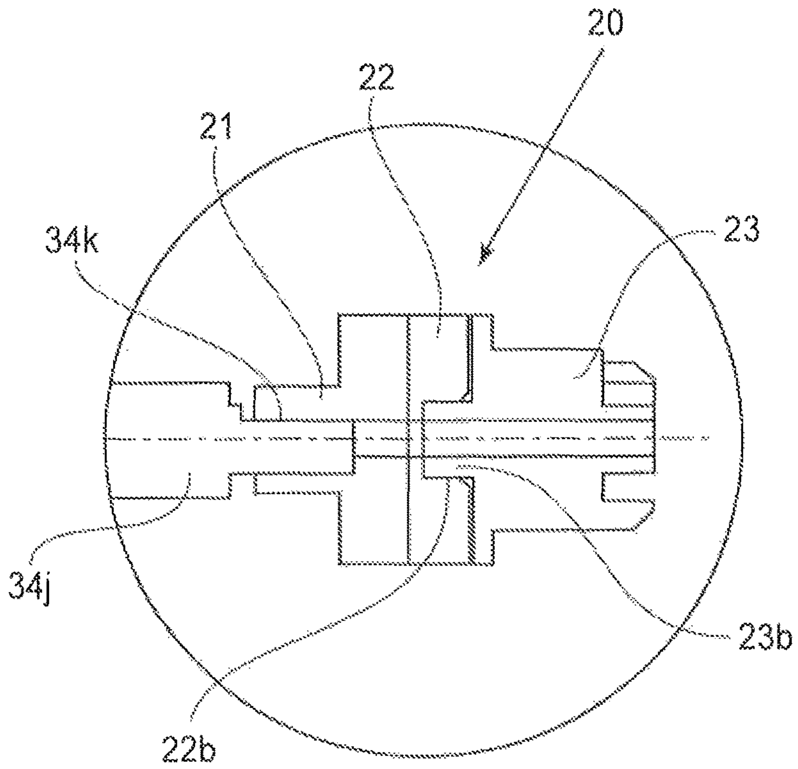
FIG. 17 includes sectional illustrations of the shaft coupling member in the embodiment of the present invention.
Figure 17:
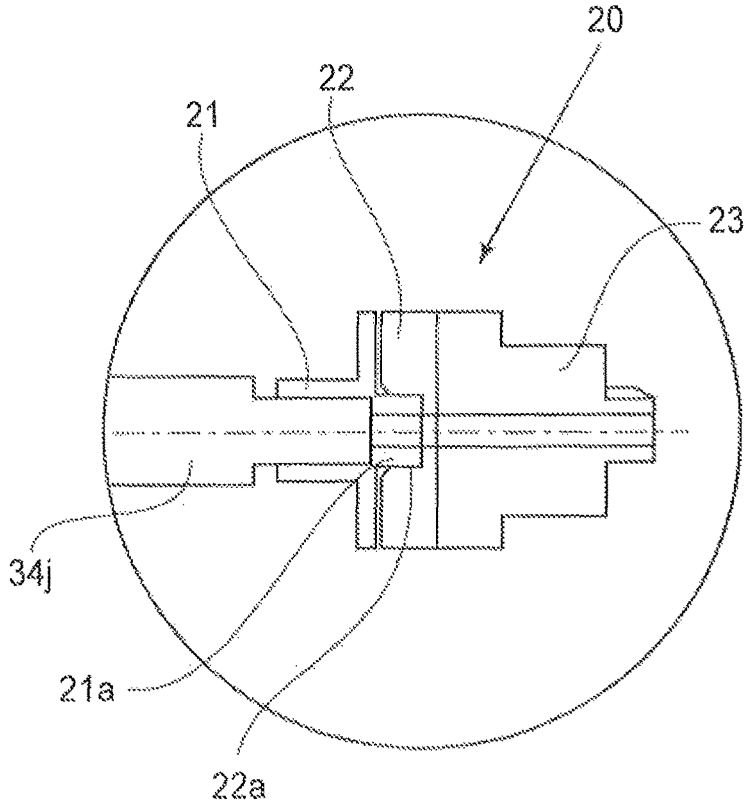

In FIG. 17, a constitution of the Oldham coupling 20 will be described in further detail using sectional views. FIG. 17(*a*) is a sectional view of the Oldham coupling 20 cut in the arrow H direction in FIG. 16, and FIG. 17(*b*) is a schematic view of the Oldham coupling 20 cut in the arrow I direction in FIG. 16. In FIG. 17(*b*), the follower-side engaging portion 21 is integrally provided with a rib 21*a*. The intermediary engaging portion 22 is provided with a groove 22*a*, and the rib 21*a* and the groove 22*a* are engaged with each other so as to be movable in the arrow H direction of FIG. 16. In FIG. 17(*a*), the driving-side engaging portion 23 is integrally provided with a rib 23*b*. The intermediary engaging portion 22 is provided with a groove 22*b*, and the rib 23*b* and the groove 22*b* are engaged with each other so as to be movable in the arrow I direction of FIG. 16. In this embodiment, the H direction and the I direction are in the substantially perpendicular relationship.

The intermediary engaging portion 22 engages with the follower-side engaging portion 21 and the driving-side engaging portion 23, and constitutes an intermediary portion for transmitting a driving force, inputted into the driving-side engaging portion 23, to the follower-side engaging portion 21. The intermediary engaging portion 22 is movable in a direction crossing the axial direction of the developer supplying roller 34 while maintaining engagement with each of the engaging portions 21 and 23.

Figure 18:
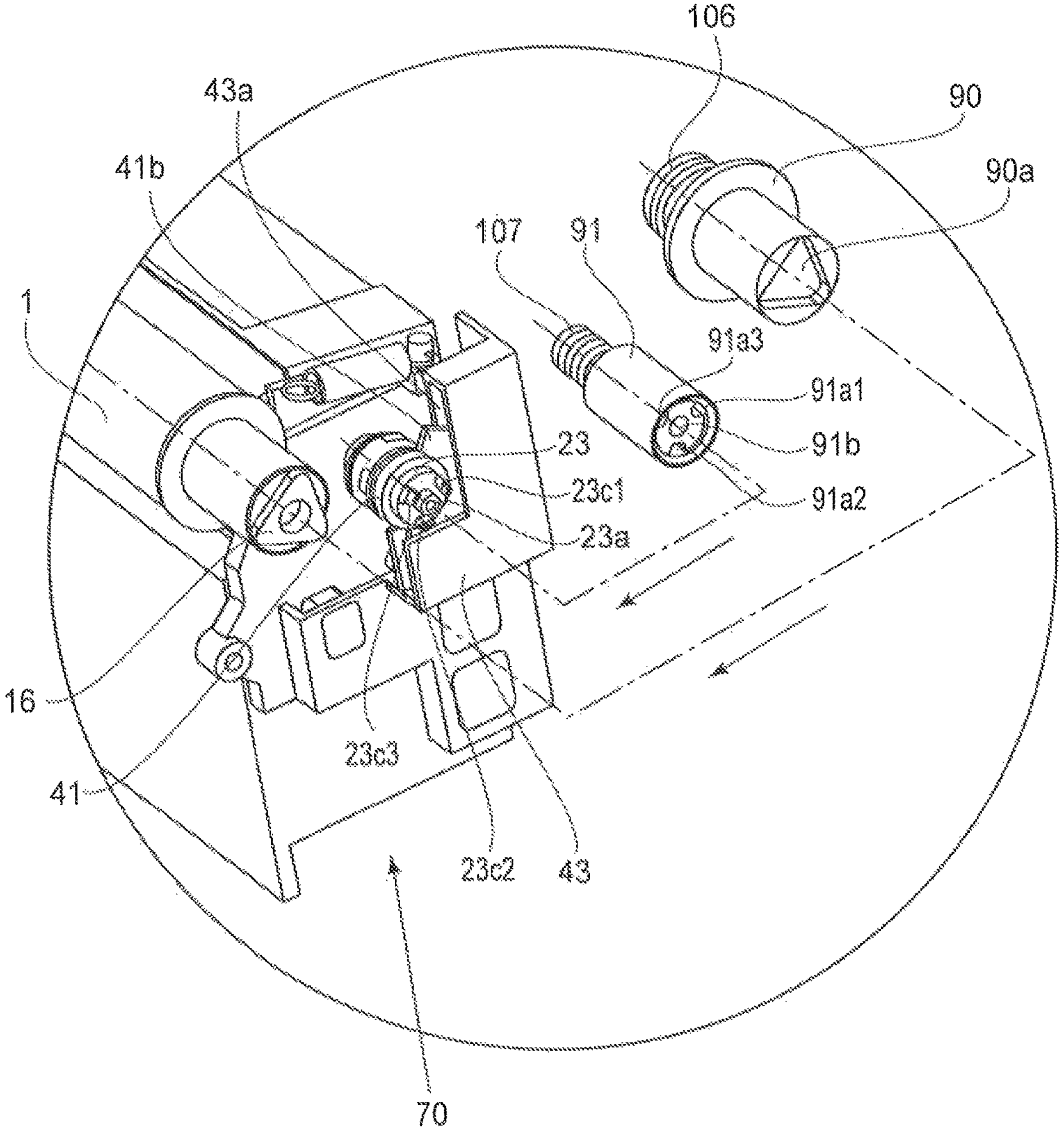
FIG. 18 is a perspective view for illustrating the shaft coupling member in a developing unit state and a first main assembly driving member and a second main assembly driving member of the image forming apparatus main assembly in the embodiment of the present invention.

FIG. 18 is an illustration showing a constitution including the coupling provided on the process cartridge 70 and the coupling provided in the apparatus main assembly 100A. At the end surface of the driving-side engaging portion 23 of the Oldham coupling 20 provided on the developing chamber 4, the three projections 23*c*1, 23*c*2 and 23*c*3 project in the axial direction. Further, a centering boss 23*a* for aligning with the axis (rotation enter) of the main assembly developing coupling 91 projects in the axial direction from the end surface of the driving-side engaging portion 23.

The photosensitive drum 1 is provided, at one end side with respect to the axial direction, with a triangular prism drum coupling 16. A guide portion 41*b* of the holding portion 41 is movable, in a direction crossing the axial direction of the developer supplying roller 34, along the groove 43*a* of the side cover 43 fixed on the developing unit with an unshown screw or the like. That is, the driving-side engaging portion 23 is movable in a direction crossing the developing unit 4 (the direction crossing the axial direction of the developer supplying roller).

In FIG. 18, the main assembly drum coupling 90, which is a first main assembly drive transmitting member for transmitting the driving force of the apparatus main assembly 100A to the photosensitive drum 1, is provided with a hole 90*a* having a substantially triangular shape in cross section. The main assembly developing coupling 91, which is a second main assembly drive transmitting member for transmitting the rotational driving force (second rotational driving force) from the apparatus main assembly 100A to the developer supplying roller 34, is provided with three holes 91*a*1, 91*a*2 and 91*a*3.

The main assembly drum coupling 90 is urged in a direction of the process cartridge 70 by a drum pressing (urging) member 106 such as a compression spring. Further, the main assembly drum coupling 90 is movable in the axial direction of the photosensitive drum 1. Further, in the case where the drum coupling 16 and the hole 90*a* of the main assembly drum coupling 90 are out of phase and in contact with each other when the process cartridge 70 is mounted in the apparatus main assembly 100A, the main assembly drum coupling 90 is pushed by the drum coupling 16, thus being retracted. Then by rotation of the main assembly drum coupling 90, the drum coupling 16 and the hole 90*a* are engaged with each other, and the rotational driving force is transmitted to the photosensitive drum 1.

Further, the main assembly developing coupling 91 is urged toward the process cartridge 70 in a direction parallel to the axial direction of the photosensitive drum 1 by a developing (means) pressing (urging) member 107, such as a compression spring. However, the main assembly developing coupling 91 has no play with respect to the direction crossing the axial direction and is provided in the apparatus main assembly 100A. That is, the main assembly developing coupling 91 rotates for transmitting the drive (driving force), but is only movable in the axial direction.

When the driving-side engaging portion 23 and the main assembly developing coupling 91 are engaged with each other as the process cartridge 70 enters the apparatus main assembly 100A, in some cases the projections 23*c*1-23*c*3 and the holes 91*a*1-91*a*3 are out of phase. In this case, free ends of the projections 23*c*1-23*c*3 contact portions other than the holes 91*a*1-91*a*3 such that the main assembly developing coupling 91 is retracted in the axial direction against an urging force of the developing pressing member 107. However, when the main assembly developing coupling 91 rotates and the projections 23*c*1-23*c*3 and the holes 91*a*1-91*a*3 are in phase, the main assembly developing coupling 91*a* advances by the urging force of the developing pressing member 107.

Then, the projections 23*c*1-23*c*3 and the holes 91*a*1-91*a*3 engage with each other, and also the centering boss 23*a*, which is an engaging portion positioning portion, and the centering hole 91*b*, which is a transmitting member positioning portion, engage with each other such that the driving-side engaging portion 23 and the axis (rotation center) of the main assembly developing coupling 91 coincide with each other. Then, by rotation of the main assembly coupling 91, the projections 23*c*1-23*c*3 and the holes 91*a*1-91*a*3 engage with each other, respectively, so that the rotational driving force is transmitted to the developer supplying roller 34. Next, rotation of the developing roller 25 will be described. The developer supplying roller 34 is provided with the driving-side engaging portion 23 at one end side and is provided with a gear at the other end side with respect to the longitudinal direction (the axial direction of the developer supplying roller). On the other hand, the developing roller 25 is provided with a gear engageable with the gear of the developer supplying roller. By this constitution, the rotational driving force is transmitted to the developing roller 25 from the developer supplying roller 34 by the gears at the other end side with respect to the longitudinal direction.

Here, the drive transmission to the main assembly drum coupling 90 and the main assembly developing coupling 91 is made by a motor provided in the apparatus main assembly 100A. By this, the photosensitive drum 1 and the developer supplying roller 34 receive the driving force from the image forming apparatus main assembly independently of each other. Incidentally, the motor may employ a constitution using a single motor per each of the process cartridges 70 for the respective colors and a constitution in which the drive is transmitted to multiple process cartridges by the single motor.

(Constitution of Developing Frame and Rotational Directions of Developing Roller and Developer Supplying Roller)

Figure 1:
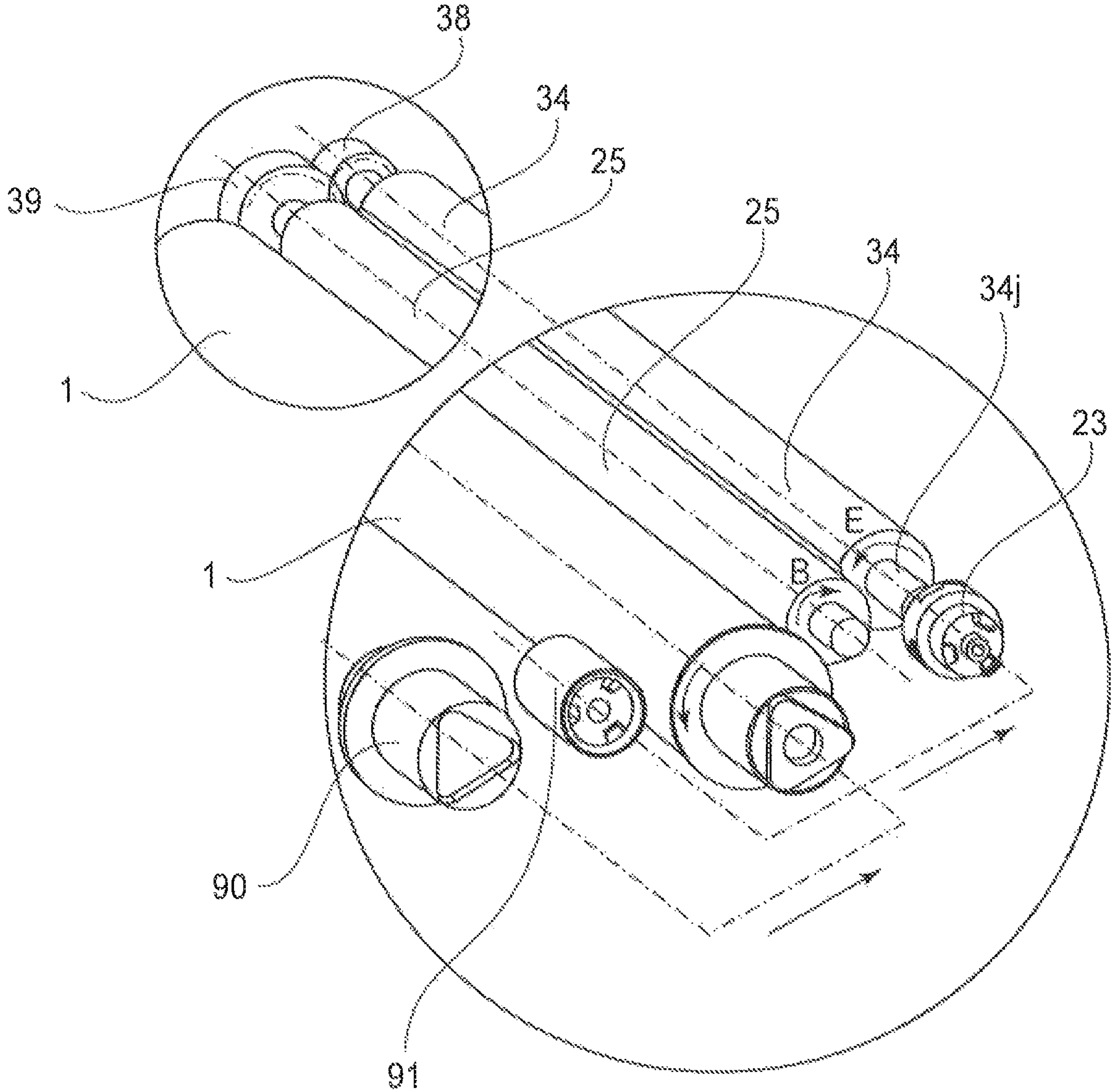
FIG. 1 is an illustration showing a drive inputting portion and a driving system of a developing unit in an embodiment of the present invention.
Figure 19:
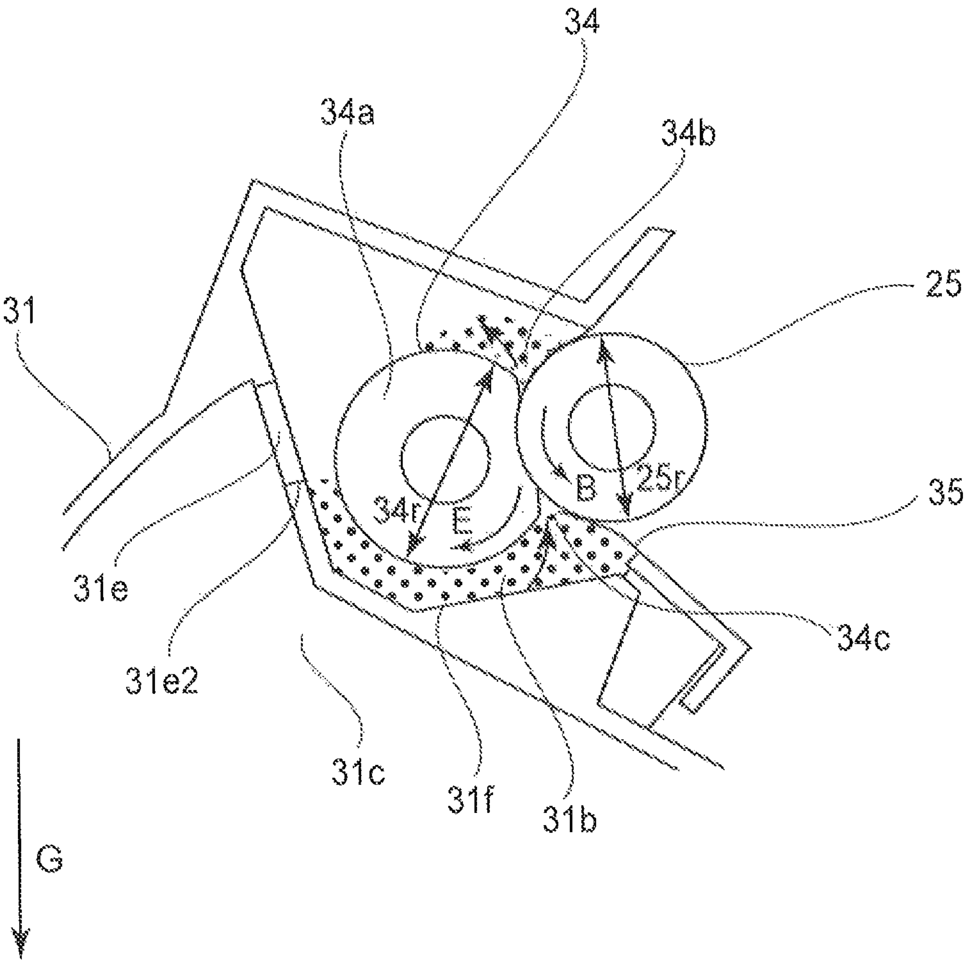
FIG. 19 is an illustration showing a constitution of a developing chamber in the embodiment of the present invention.
Figures 25, 26:
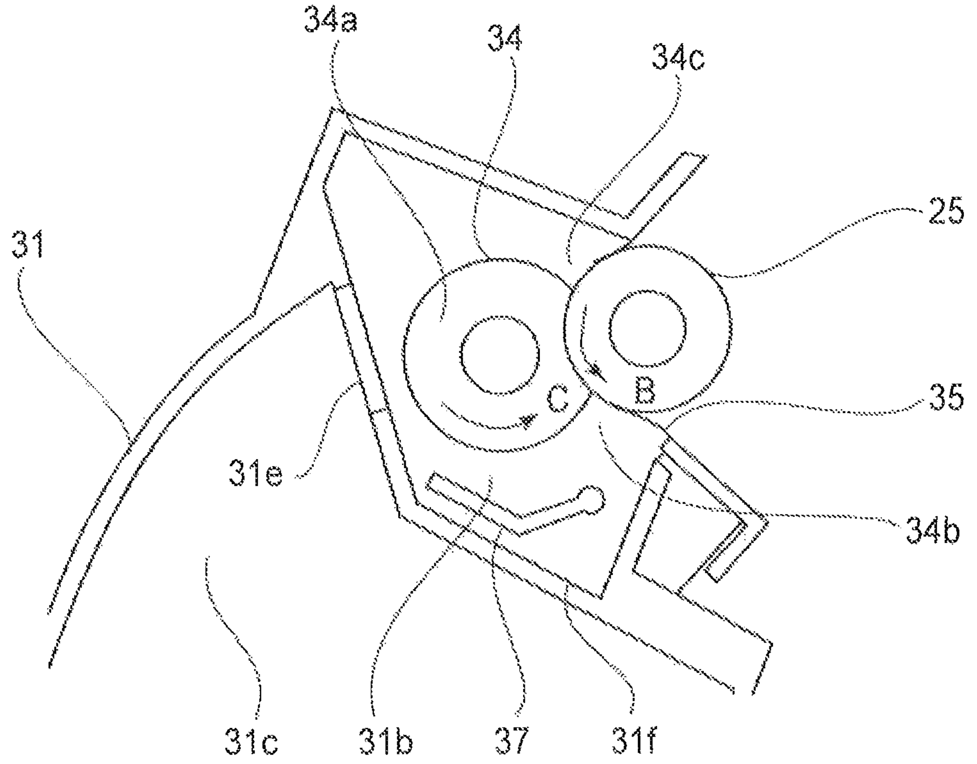
FIG. 25 is a table showing a rank of a relationship between a peripheral speed difference and an image or the like in the embodiment of the present invention.
FIG. 26 is an illustration showing a comparison example in which a developing chamber toner feeding member is provided in a developing chamber.

Next, a constitution of the developing frame and the rotational directions of the developing roller and the developer supplying roller will be described using FIGS. 1, 3, 19 and 26. FIG. 1 is an illustration showing a driving force inputting portion and a driving system of the developing unit in this embodiment. FIG. 3 is an illustration showing the cartridge mounted in the image forming apparatus. FIG. 19 is an illustration showing a constitution of the developing chamber in this embodiment. FIG. 26 is an illustration showing a comparison example in which the developing chamber toner feeding member is provided in the developing chamber.

As described above, the toner accommodating portion 31*c* of the developing frame 31 is provided with the toner feeding member 36 (FIG. 3) for stirring the accommodated toner and feeding the toner to the developing chamber 31*b* via the toner opening 31*e*. Incidentally, in this embodiment, a constitution in which the developing roller 25 and the developer supplying roller 34 are provided in the developing chamber 31*b* is employed. Further, the toner accommodating portion 31*c* is provided below the developing chamber 31*b* with respect to the direction of gravity, and the toner feeding member 36 is therefore positioned below the developing chamber 31*b* with respect to the direction of gravity. That is, the process cartridge 70 in this embodiment has a scooping-up constitution in which the toner is fed by the toner feeding member 36 against gravity from the toner accommodating portion 31*c* disposed below the developing chamber 31*b* to the developing chamber 31*b* disposed above the toner accommodating portion 31*c*.

The developer fed from the toner accommodating portion 31*c* to the developing chamber 31*b* stagnates at a developing chamber bottom (portion) 31*f* as shown in FIG. 19. In order to feed the developer stagnating at the developing chamber bottom 31*f* to the developer supplying roller, in the comparison example shown in FIG. 26, a developing chamber toner feeding member 37 is provided at the developing chamber bottom 31*f*, and the a developing chamber toner feeding member 37 is moved, so that the developer stagnating at the developing chamber 31*f* is supplied to the developer supplying roller 34.

In this embodiment, as shown in FIG. 19, the developer supplying roller 34 is set so as to rotate in a direction (arrow E direction) opposite to the rotational direction (arrow B direction) of the developing roller 25. That is, at the contact portion between the developing roller 25 and the developer supplying roller 34, the respective surfaces thereof are moving in the same direction. Incidentally, as shown in FIG. 1, the rotational direction of the photosensitive drum 1 is an opposite direction to the rotational direction of the developing roller 25. Further, the rotational direction of the photosensitive drum 1 is the same as the rotational direction of the developer supplying roller 34.

In FIG. 19, the developer supplying roller 34 has a constitution in which a sponge portion (elastic layer having an inner porous portion) 34*a* is provided. Further, in FIG. 19, the developing roller 25 has an elastic layer 25*a*. A surface hardness of the developer supplying roller 34 is lower than a surface hardness of the developing roller 25, and therefore when both rollers are in contact with each other, as shown in FIG. 19, the developer supplying roller 25 is dented (deformed). Here, as shown in FIG. 19, the developer supplying roller 34 is in a state in which the surface of the sponge portion 34*a* is deformed correspondingly to a penetration amount at the contact portion with the developing roller 25. At this time, the toner contained in the sponge portion 34*a* is discharged from the sponge portion 34*a*. Hereinafter, a portion where the toner is discharged by deformation of the sponge portion 34*a* is referred to as a discharging portion 34*b* and will be described. This discharging portion 34*b* is a region in a side upstream of the contact portion between the developer supplying roller 34 and the developing roller 25 with respect to the rotational direction of the developer supplying roller 34.

On the other hand, at a portion where the rotation of the developer supplying roller 34 advances and the state of the developer supplying roller 34 is restored from the deformed state, air pressure inside the sponge portion 34*a* lowers with the restoration. For that reason, a flow of air is generated for taking in the toner toward the inside of the sponge portion 34*a*. Hereinafter, a portion where the state of the sponge portion 34*a* is restored from the deformed state and the toner is taken in is referred to as a taking-in portion 34*c* and will be described. This taking-in portion 34*c* is a region in a side downstream of the contact portion between the developer supplying roller 34 and the developing roller 25 with respect to the rotational direction of the developer supplying roller 34. The toner taken in this region is discharged again at the discharging portion 34*b*.

In this way, during the rotational drive of the developer supplying roller 34, the toner is circulated by continuously performing the above-described taking-in and discharging, and in this process, supply of the developer to the developing roller 25 is made. In order to provide a stable supply of the developer to the developing roller 25, it is important to stably supply the toner to the taking-in portion 34*c*.

As shown in FIG. 26, the rotational direction (arrow C direction) of the developer supplying roller 34 in the comparison example is set at the same direction as the rotational direction (arrow B direction) of the developing roller 25 in many cases. In this case, as in this embodiment, in the constitution in which the toner is fed from the lower toner accommodating portion 31*c* to the upper developing chamber 31*b*, the taking-in portion 34*c* is positioned above the developing roller 25 and the developer supplying roller 34. Accordingly, in order to stably supply the toner to the taking-in portion 34*c*, there is a need to provide an arrangement relationship such that the toner which passes through the toner opening 31*e* and which moves toward the taking-in portion 34*c* positioned above the developer supplying roller 34 is not blocked by the developer supplying roller 34 itself. Further, the toner discharged from the discharging portion 34*b*, the toner fallen by regulation with a developing blade 35 and the toner fed from the toner accommodating portion 31*c* accumulate at the bottom 31*f* of the developing chamber 31*b*. In order to stir and circulate this toner at the bottom 31*f* of the developing chamber 31*b*, the developing chamber toner feeding member 37 is provided as a stirring member, and there is a need to supply the toner to the developer supplying roller 34 by the developing chamber toner feeding member 37.

On the other hand, in this embodiment, with respect to the direction of gravity as shown in FIG. 19, the taking in portion 34*c* is positioned below the developing roller 25 and the developer supplying roller 34, and is close to the bottom 31*f* of the developing chamber 31*b*. That is, the toner fed to the developing chamber 31*b* moves toward the rear portion by the airflow generated at the taking-in portion 31*c*, so that the taking-in portion 31*c* is located at a position where the toner easily reaches the taking-in portion 31*c* naturally. Accordingly, constraint of an arrangement relationship between the toner opening 31*e* and the developer supplying roller 34 as in the conventional constitution is alleviated, and there is a high degree of flexibility in design of the arrangement of the toner opening 31*e* and the developer supplying roller 34.

Here, with respect to the direction of gravity, when a lower end 31*e*2 of the toner opening 31*e* is disposed at a position higher than the bottom 31*f* of the developing chamber 31, the level of toner is raised to a position close to the taking-in portion 34*c*, and therefore such an arrangement is desirable. Particularly, when the position of the lower end 31*e*2 of the toner opening 31*e* is set at a position higher than the taking-in portion 34*c* with respect to the direction of gravity, the level of toner in the developing chamber 31*b* always reaches a height of the taking-in portion 34*c*, and therefore a toner supplying property to the developing chamber 31*c* is further stabilized. In this embodiment, the height of the lower end 31*e*2 of the toner opening 31*e* is disposed at a position higher than a downstream end of the contact portion between the developer supplying roller 34 and the developing roller 25 with respect to the rotational direction of the developer supplying roller 34. Further, the taking-in portion 34*c* is positioned close to the bottom 31*f* of the developing chamber 31*b*, and therefore the toner accumulated at the bottom 31*f* is naturally taken in by the developer supplying roller 34 and is gradually consumed.

Accordingly, unlike the conventional constitution, the circulation of the toner is made even when a developing chamber toner feeding member 37 as shown in FIG. 26 is not used, and therefore a space in which the developing chamber toner feeding member 37 has been conventionally disposed can be filled such that it is possible to reduce the residual toner.

(Surface Speeds and Roller Diameters of Developing Roller and Developer Supplying Roller)

Using FIG. 19, surface speeds of the developing roller 25 and the developer supplying roller 34 will be described. As shown in FIG. 19, the developing roller 25 and the developer supplying roller 34 rotate in opposite directions. Incidentally, at the contact portion, the respective surfaces move in the same direction. Here, the surface speed of the developer supplying roller 34 is set so as to be higher than the surface speed of the developing roller 25. This is because the toner supplying property to the developing roller 25 and a property of peeling off the toner from the developing roller 25 that is not used for development are taken into consideration. The surface speed of the developer supplying roller 34 is higher than the surface speed of the developing roller 25, so that a portion, where the toner is contained in a sufficient amount, of the sponge portion 34*a* always contacts the developing roller 25, and therefore stable toner supply to the developing roller 25 can be effected. Further, with respect to the toner peeling-off property, the surface speed of the developer supplying roller 34 is higher than the surface speed of the developing roller 25 and therefore a frictional force due to a peripheral speed driving force is generated such that the toner on the developing roller 25, which is not used for development, can be peeled off.

Incidentally, with respect to the toner supplying property and the toner peeling-off property, it has been known that an effect is larger when the peripheral speed difference is larger. However, the rate of rotation of the developing roller 25 has a large influence on the toner supplying property to the photosensitive drum 1, and therefore from the viewpoint of a developing process, it is not desirable that the peripheral speed difference is provided by lowering the rate of rotation of the developing roller 25.

Therefore, in order to increase the peripheral speed of the developer supplying roller 34 while maintaining the rate of rotation of the developing roller 25, a method is used in which the rate of rotation of the developer supplying roller 34 is relatively increased by changing a gear ratio between a developer supplying roller gear 38 and a developing roller gear 39 (FIG. 1), which is described later, and a method is used in which a diameter 34*r* of the sponge portion 34*a* is increased. In the case where the rate of rotation of the developer supplying roller 34 is increased relatively while maintaining the rate of rotation of the developing roller 25, there is a need to increase an output from the main assembly driving motor (unshown) which is a driving source, and therefore much more electric power is required. Accordingly, in order to also suppress electric power consumption, it is desirable that the diameter 34*r* of the sponge portion 34*a* be large, and in this embodiment, a diameter 25*r* of the developing roller 25 is set at 12 mm and the diameter 34*r* of the developer supplying roller 34 is set at 13.3 mm, so that a diameter ratio therebetween is about 1.11. However, it is not necessarily required that the diameter 34*r* of the sponge portion 34*a* be made larger than the diameter 25*r* of the developing roller 25, but a desired peripheral speed difference may also made by the gear ratio. Incidentally, although a driving system in this embodiment will be described later, with respect to the number of teeth of the developer supplying roller gear 38 and the developing roller gear 39 (FIG. 1), which are directly connected to each other, the number of teeth of the developer supplying roller gear 38 is set at 18 teeth, and the number of teeth of the developing roller gear 39 is set at 26 teeth, so that the gear ratio therebetween is about 1.44.

Here, with respect to a surface speed ratio between the developing roller 25 and the developer supplying roller 34 (i.e., (developer supplying roller surface speed)/(developing roller surface speed), hereinafter referred to as a "peripheral speed ratio"), it is desirable that the peripheral speed ratio is set in a range of 1.3 or more to 1.8 or less. This range is such that the necessary and sufficient toner supplying property and toner peeling off property can be maintained. When the peripheral speed ratio is below 1.3, there is a liability that a good toner peeling-off property cannot be maintained, so that there is a liability of the influence of a ghost or the like on an image quality. Further, when the peripheral speed ratio is 1.8 or less, the toner supplying property and the toner peeling-off property can be sufficiently maintained. When the peripheral speed ratio exceeds 1.8, friction becomes large, and thus abrasion of the developer supplying roller and the developing roller is liable be generated, and it is therefore not desirable that the surface speed of the developer supplying roller 34 is excessively increased. Here, in this embodiment, by the above-described diameter ratio and gear ratio, the surface speed of the developing roller 25 is set at about 304 mm/s and the surface speed of the developer supplying roller 34 is set at about 487 mm/s, so that the peripheral speed ratio therebetween is about 1.60. In this setting, it has already been confirmed that a sufficient effect with respect to the toner supplying property and the toner peeling-off property can be obtained. Incidentally, the surface speed referred to herein is a speed on the surface excluding the contact portion between the developing roller 25 and the developer supplying roller 34, and this is similarly applicable to also the peripheral speed ratio.

(Drive Input and Driving System for Developing Unit)

Using FIGS. 1 and 20, a drive input constitution and a constitution of the driving system for the developing unit 4 will be described. As described above, the driving force outputted from the main assembly driving motor (unshown), which is the driving source of the apparatus main assembly 100A, is inputted into the developing unit 4 by engagement of the main assembly developing coupling 91 of the apparatus main assembly 100A with the driving-side engaging portion 23 of the Oldham coupling 20 provided at the end portion of the shaft portion 34*j* of the developer supplying roller 34.

Here, first, the drive input constitution of the developing unit 4 will be described using FIG. 1. FIG. 1 is an illustration showing the driving system for the developing unit 4, and for simplification of explanation, only the developing roller 25, the developer supplying roller 34 and the driving system relating to these rollers are extracted and shown.

As shown in FIG. 1, the shaft portion 34*j* of the developer supplying roller 34 is provided with the developer supplying roller gear 38 which is an upstream drive transmitting member (first drive transmitting portion). Similarly, the shaft portion 34*j* of the developing roller 25 is provided with the developing roller gear 39 which is a downstream drive transmitting member (second drive transmitting portion) provided so as to directly engage with the developer supplying roller gear 38. Incidentally, in this embodiment, a gear train such as the developer supplying roller gear 38 is provided in a side (the other side) opposite from the driving force inputting portion of the developing unit 4 with respect to the axial direction from the viewpoint of space in the cartridge, but the gear train and the driving force inputting portion may also be provided in the same side. Here, the rotational directions of the developing roller 25 and the developer supplying roller 34 are opposite to each other, and therefore there is no need to provide an idler gear between the developer supplying roller gear 38 and the developing roller gear 39 such that the number of parts can be reduced. The driving force inputted onto the shaft of the developer supplying roller 34 is transmitted from the developer supplying roller gear 38 to the developing roller 25 via the developing roller gear 39. Incidentally, as described above, in this embodiment, the number of teeth of the developer supplying roller gear 38 is set at 18 teeth, and the number of teeth of the developing roller gear 39 is set at 26 teeth.

Using FIG. 20, the driving system for the developing unit will be described. FIG. 20 is an illustration showing the driving system at a downstream side of the developing roller 25.

Figure 20:
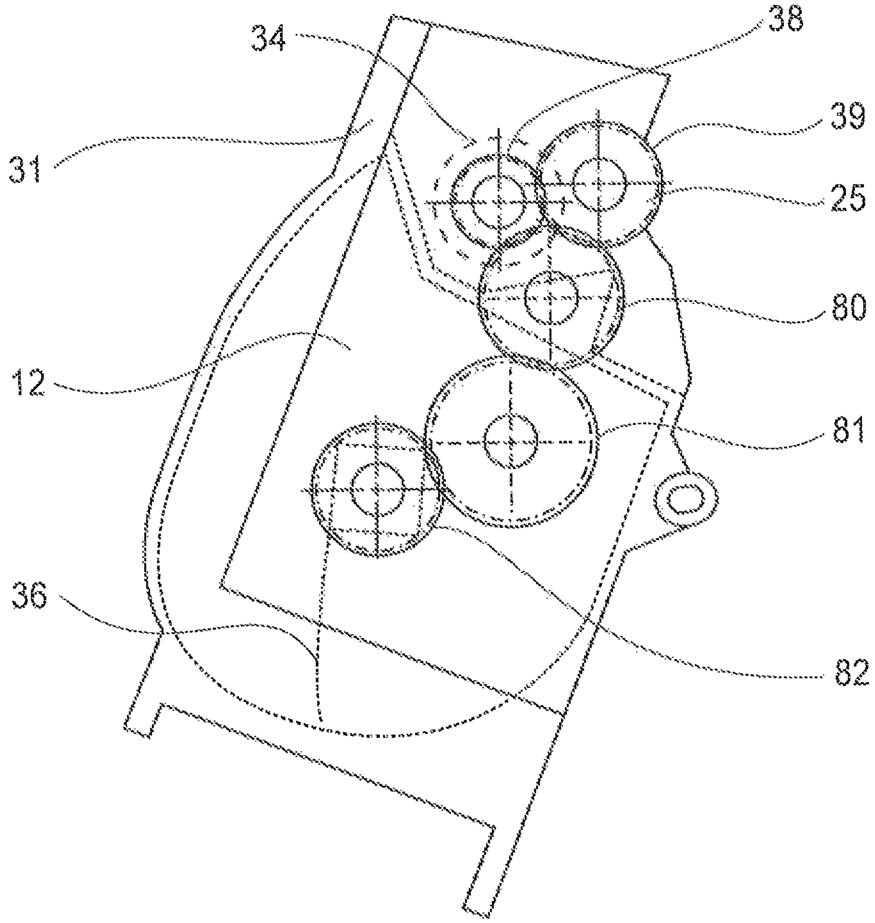
FIG. 20 is an illustration showing a driving gear train of the developing unit in the embodiment of the present invention.

As shown in FIG. 20, in at a downstream side of the developing roller gear 39, a developing (means) idler gear 80, a stirring idler gear 81 and a stirring gear 82, which are used for transmitting the drive to the toner feeding member 36, are provided in the listed order. The developing idler gear 80 and the stirring idler gear 81 are rotatably supported by the front developing bearing 12, and the stirring gear 82 is rotatably supported by the developing frame 31 in a state in which the stirring gear 82 is connected to the toner feeding member 36 by an unshown connecting means such as snap-fit means and an engaging portion. The driving force inputted onto the shaft of the developer supplying roller 34 is transmitted in the order of the developer supplying roller gear 38, the developing roller gear 39, the developing idler gear 80, the stirring idler gear 81 and the stirring gear 82, and is finally transmitted to the toner feeding member 36.

Figure 27:
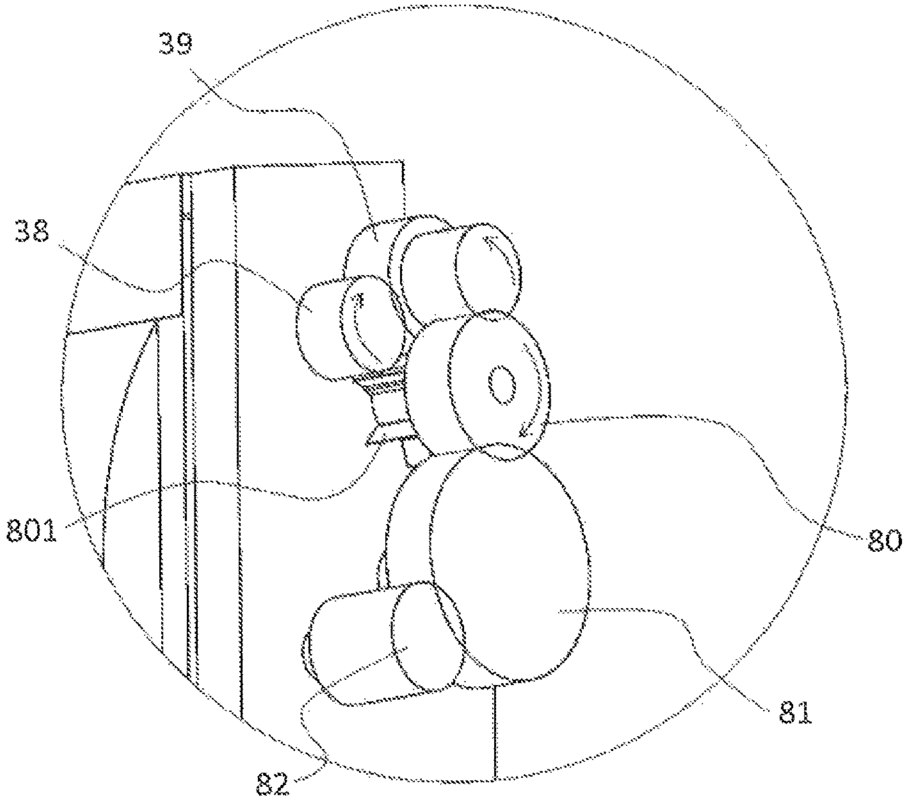
FIG. 27 is an illustration showing flexible sheets adjacent to the developer roller gear in an embodiment of the present invention.

As shown in FIG. 27, the developing idler gear 80 is provided with flexible sheets 801 adjacent to the position where the developer supplying roller gear 38 and the developing roller gear 39 are engaged with each other. The flexible sheets 801 rotate in synchronism with the rotation of the developing idler gear 80, so that they contact the developing roller gear 39 while rotating, by which wear chips, which are produced by the sliding motion between the gear teeth in the case of a long life and high speed process cartridge 70, are removed. By this, images can be produced stably throughout the life of the process cartridge 70.

Figure 28:
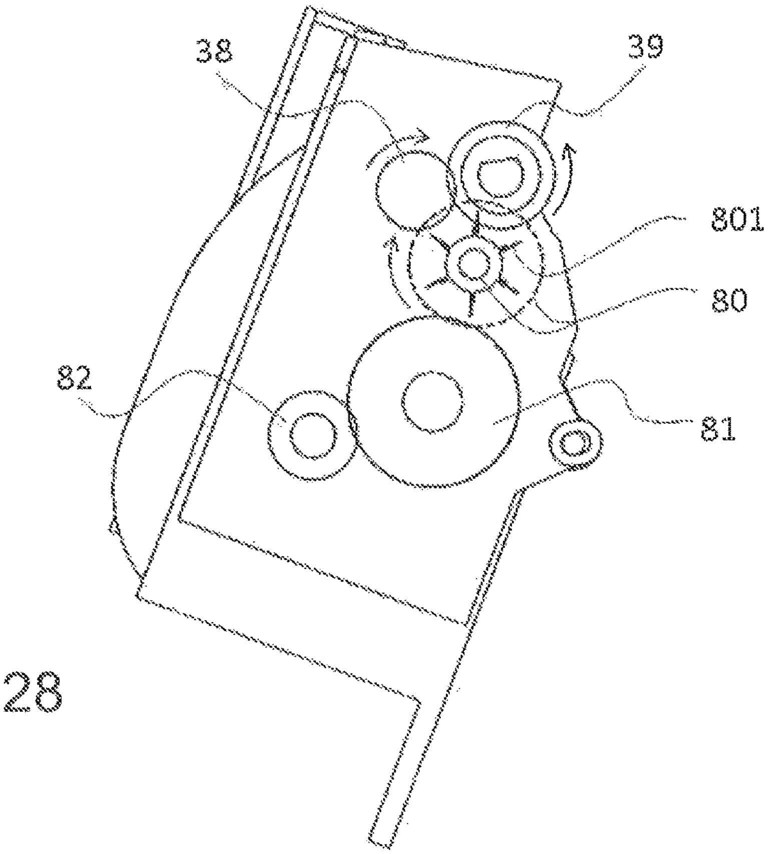
FIG. 28 is an illustration of a sectional view in which the gear portion of the developing idler gear is omitted.

FIG. 28 is a sectional view illustrating the positions of the flexible sheet 801 and the developing roller gear, in which the gear portion of the developing idler gear 80 is omitted for better illustration.

(Small Deformation of Developer Supplying Roller)

Figure 21:
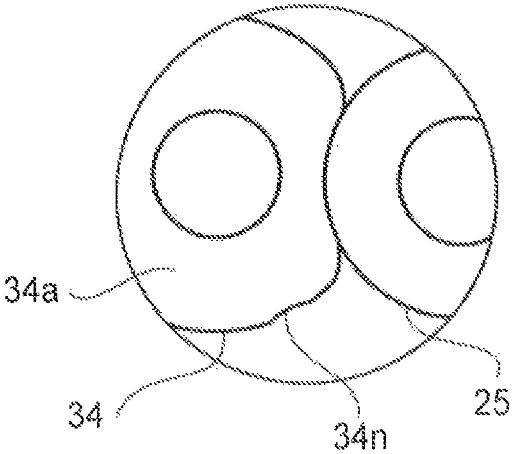
FIG. 21 is an illustration showing minute deformation of a sponge portion in the embodiment of the present invention.

Using FIGS. 21 and 22, small deformation generating at the sponge portion 34*a* of the developer supplying roller 34 will be described. The developer supplying roller 34 is always supported in the contact state with the developing roller 25, but when the developer supplying roller 34 is left standing for a long time in a high-temperature environment or the like, in some cases small plastic deformation is generated at the contact portion with the developing roller 25 as shown in FIG. 21. Hereinafter, with respect to the developer supplying roller 34, a region where the small plastic deformation is generated will be referred to as a small deformation portion 34*n* and will be described.

Figure 22:
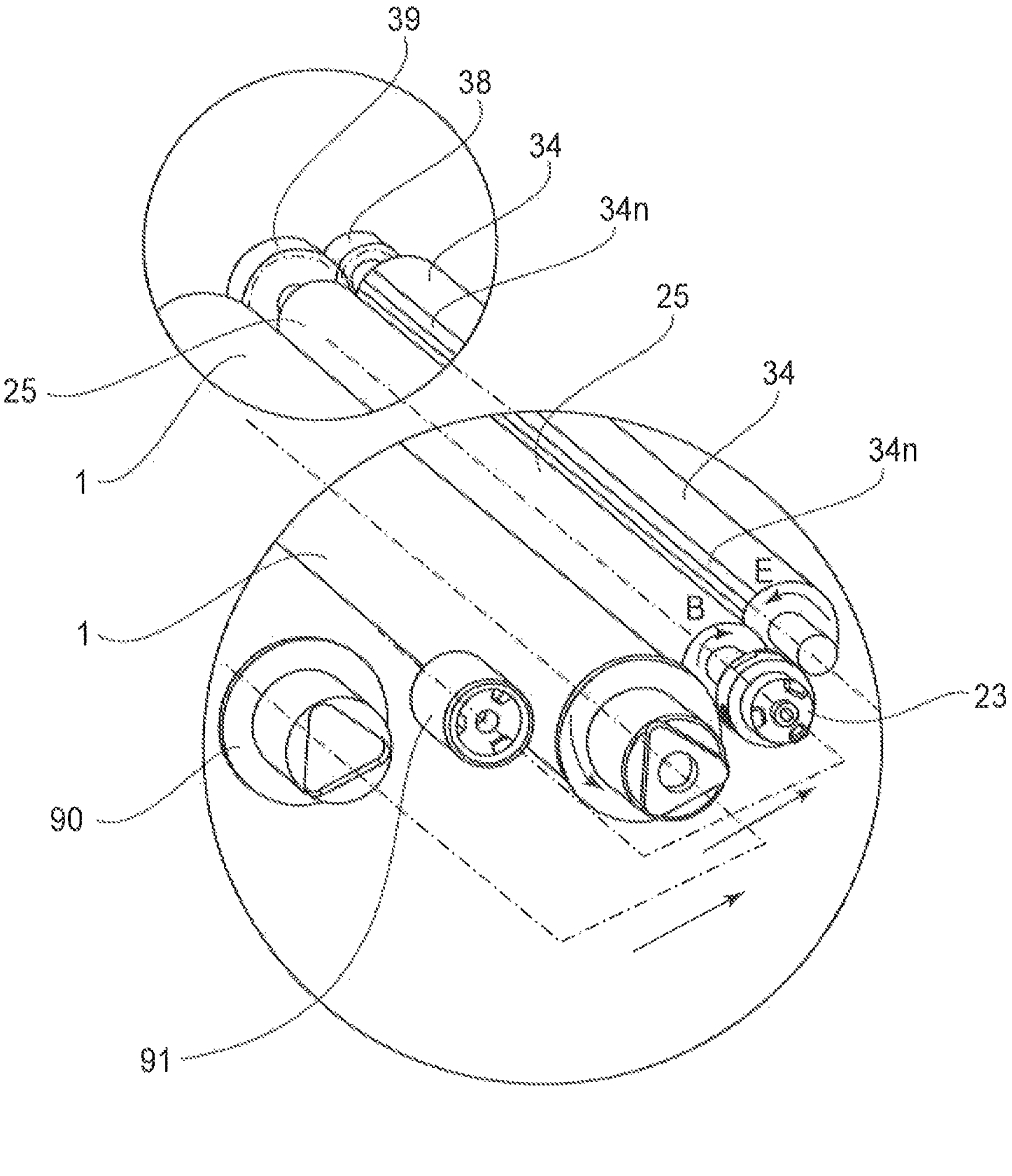
FIG. 22 is an illustration showing the case where a developing driving force is inputted onto a developing roller shaft.
Figure 23:
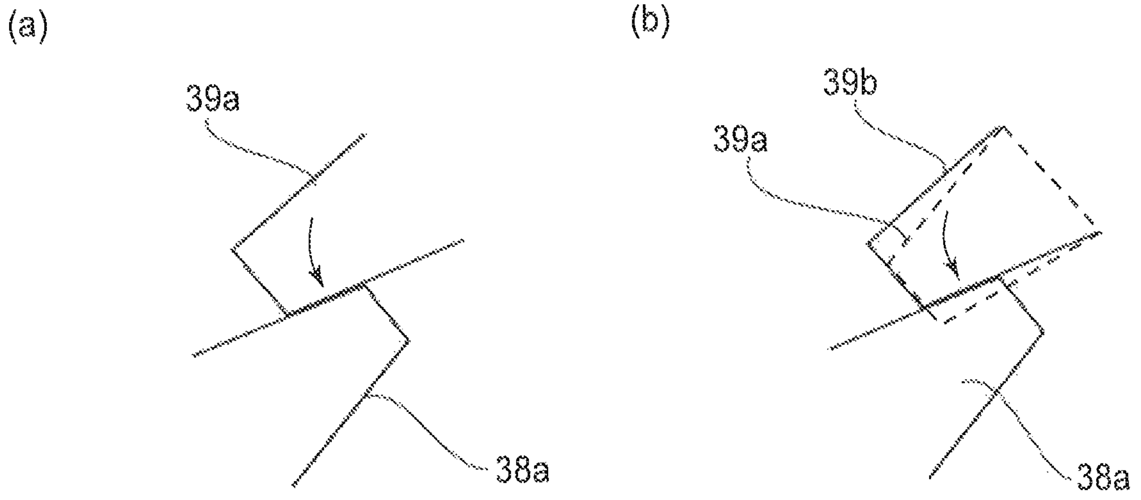
FIG. 23 includes illustrations showing teeth of gears in a constitution in which the developing driving force is inputted onto the developing roller shaft.

First, FIG. 22 is an illustration showing a constitution in which different from this embodiment, the driving force from the main assembly is not inputted into the developer supplying roller 34, but is inputted into the developing roller 25. In this constitution, the developing roller gear 39 drives the developer supplying roller gear 38. Here, FIG. 23 is an illustration showing one tooth of each of the developer supplying roller gear and the developing roller gear at an engaging portion between a tooth 38*a* of the developer supplying roller gear and a tooth 39*a* of the developing roller gear. FIG. 23(*a*) is an illustration showing a state in which the sponge portion 34*a* that is not deformed reaches the contact position with the developing roller 25, and FIG. 23(*b*) is an illustration showing a state in which the small deformation portion 34*n* reaches the contact position with the developing roller 25. A broken line 39*b* shown in (b) of FIG. 23 represents a behavior of the developing roller gear tooth 39*a* in a state in which a load from the developer supplying roller gear 38 is decreased. Using FIGS. 22 and 23, the influence due to the small deformation of the developer supplying roller 34 will be described.

In the case where the sponge portion 34*a* of the developer supplying roller 34 is not deformed, as shown in FIG. 23(*a*), the developing roller gear tooth 39*a* rotates in a state in which it receives a certain load from the developer supplying roller gear tooth 38*a*. However, when the small deformation portion 34*n* of the developer supplying roller 34 reaches the contact position with the developing roller 25, a frictional force generated between the developing roller 25 and the developer supplying roller 34 instantaneously decreases. By this, the developer supplying roller 34 is instantaneously in a state in which the developer supplying roller 34 easily rotates, and therefore, as shown in FIG. 23(*b*), the load received from the developer supplying roller gear tooth 38*a* by the driven developing roller gear tooth 39*a* instantaneously decreases. By this, the rotational speed of the developing roller 25 is instantaneously increased. Therefore, the surface speed of the developing roller 25 instantaneously increases relative to the surface speed of the photosensitive drum 1, and there is a possibility of non-uniform toner supply from the developing roller 25 to the photosensitive drum 1. Thus, a phenomenon such as a lateral stripe occurs in the image. Incidentally, it is known that this phenomenon is more likely to occur as the peripheral speed difference between the surface speed of the developing roller 25 and the surface speed of the developer supplying roller 34 becomes larger.

Figure 24:
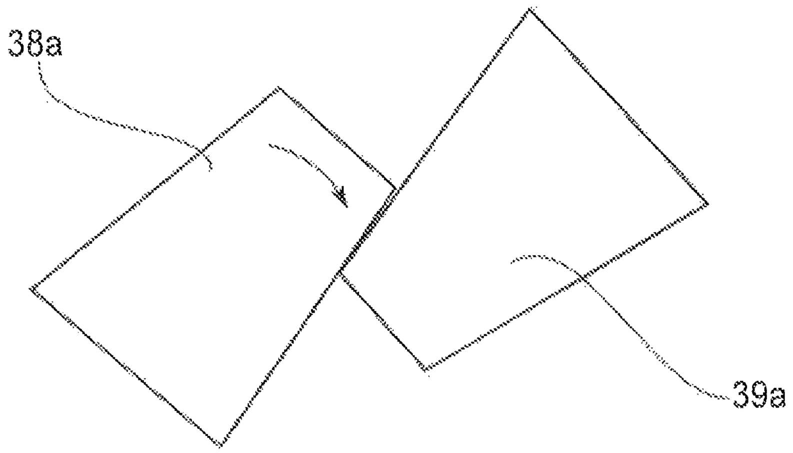
FIG. 24 is an illustration showing the teeth of gears in the embodiment of the present invention.

On the other hand, in the embodiment shown in FIG. 1, the developer supplying roller 34 is in a state in which the developer supplying roller 34 readily rotates instantaneously by passing of the small deformation portion 34*n* of the developer supplying roller 34 through the contact portion with the developing roller 25. However, as shown in FIG. 24, there is no large fluctuation in the load for rotating the developing roller 25, and, therefore, there is no generation of the influence on the behavior of the developing roller 25. Accordingly, even when the small deformation is generated at the sponge portion 34*a* of the developer supplying roller 34, non-uniformity does not readily occur in toner supply from the developing roller 25 to the photosensitive drum 1. For that reason, the constitution in which the driving force in inputted into the developer supplying roller 34 is capable of suppressing lower image quality compared to a constitution in which the driving force is inputted into the developing roller 25.

Here, when the toner peeling-off property, the electric power consumption and the influence of the small deformation of the sponge portion 34*a* on the image are considered from the viewpoint of the above-described roller peripheral speed difference, a tendency as shown in the Table in FIG. 25 is obtained from experimental results. That is, the peripheral speed difference between the surface speed of the developing roller 25 and the surface speed of the developer supplying roller 34 may desirably be set at (developer supplying roller/developing roller)=1.3 or more and 1.8 or less from the viewpoint of the influence of the small deformation of the sponge portion 34*a* on the image.

As described above, according to this embodiment, in the developing device of the constitution in which the toner is scooped up from the toner accommodating chamber disposed below the developing chamber 31*b* to the upper developing chamber 31*b*, the rotational direction (arrow C direction) of the developer supplying roller 34 is opposite to the rotational direction (arrow B direction) of the developing roller. By this, it is possible to suppress the stagnation of the toner without providing the stirring member in the developing chamber 31*b*, and therefore it is possible to reduce the number of parts and to decrease the amount of the residual toner. Further, the surface speed of the developer supplying roller 34 is set so as to be higher than the surface speed of the developing roller, whereby it becomes possible to stably supply the toner to the developing roller. Further, the driving force from the image forming apparatus main assembly is inputted onto the shaft of the developer supplying roller 34, whereby it is possible to reduce image defects, e.g., when the developer supplying roller 34 is left standing in the high-temperature environment or the like. From the above, in the developing device having the scooping constitution including the toner accommodating chamber below the developing chamber 31*c*, it is possible to provide a process cartridge and an image forming apparatus that are capable of improving the image quality while reducing the number of parts and decreasing the amount of the residual toner.

INDUSTRIAL APPLICABILITY

According to the present invention, there are provided a process cartridge and an image forming apparatus which are capable of realizing reduction of a residual developer while reducing the number of parts, in a constitution that a developer is scooped up from a developer accommodating chamber, provided below a developing chamber, to the developing chamber above the developer accommodating chamber.

The invention claimed is:

1. A process cartridge comprising:
- a rotatable photosensitive drum;
- a first casing rotatably supporting the photosensitive drum;
- a rotatable developing roller;
- a rotatable toner supplying roller provided in contact with the developing roller, the toner supplying roller being configured to supply toner to the developing roller;
- a second casing rotatably supporting the developing roller and the toner supplying roller, the second casing including (i) a toner chamber configured to contain toner and (ii) a developing chamber in which the toner supplying roller is positioned;
- a rotatable feeding member provided in the toner chamber and configured to feed the toner from the toner chamber to the developing chamber;
- a coupling operatively connected to the toner supply roller and configured to receive a driving force for rotating the toner supplying roller, the developing roller, and the feeding member;
- a first driving force transmitting portion operatively connected to the toner supply roller and configured to transmit the driving force received by the coupling to the developing roller; and
- a second driving force transmitting portion operatively connected to the developing roller and configured to transmit the driving force from the first driving force transmitting portion to the developing roller,
- wherein the process cartridge is configured such that, when the coupling receives the driving force and the process cartridge is oriented with the developing roller positioned above the toner chamber, (i) a rotational direction of the developing roller is opposite to a rotational direction of the toner supplying roller, (ii) a part of a surface of the toner supplying roller rotates from a first position at which the part of the surface of the toner supply roller contacts a surface of the developing roller to a second position where the part of the surface of the toner supplying roller moves out of contact with the surface of the developing roller, with the first position being above the second position, (iii) the feeding member feeds toner upward from the toner chamber to the developing chamber, and (iv) a speed of the surface of the toner supplying roller is greater than a speed of the surface of the developing roller, and
- wherein the developing roller is movable towards and away from the photosensitive drum in response to movement of the second casing relative to the first casing.

2. A process cartridge according to claim 1, wherein at least apart of the coupling is movable relative to the toner supplying roller in a direction crossing a rotational axis of the toner supplying roller.

3. A process cartridge according to claim 1, wherein the coupling is an Oldham coupling.

4. A process cartridge according to claim 1, wherein the toner supplying roller and a wall of the developing chamber define a space therebetween for storing the toner.

5. A process cartridge according to claim 1, wherein a diameter of the toner supplying roller is greater than a diameter of the developing roller.

6. A process cartridge according to claim 1, wherein a ratio of the speed of the surface of the toner supplying roller to the speed of the surface of the developing roller is:

$$1.3 \leq \text{toner supplying roller/developing roller} \leq 1.8.$$

7. A process cartridge according to claim 1, wherein the toner supplying roller includes an elastic layer.

8. A process cartridge according to claim 1, wherein the toner supplying roller includes a sponge configured to store the toner.

9. A process cartridge according to claim 1, wherein the driving force is transmitted from the second driving force transmitting portion to the feeding member.

10. A process cartridge according to claim 9, wherein the second driving force transmitting portion is configured to transmit the driving force to the feeding member via at least one gear.

11. A process cartridge according to claim 9, further comprising:

a first idler gear engaging with the second driving force transmitting portion;

a second idler gear engaging with the first idler gear; and a feeding member gear operatively connected to the feeding member and engaging with the second idler gear, wherein the driving force is transmitted from the second driving force transmitting portion to the feeding member via the first idler gear, the second idler gear, and the feeding member gear.

12. A process cartridge according to claim 1, wherein the coupling is provided at an end of a shaft of the toner supplying roller.

13. A process cartridge according to claim 1, wherein the first driving force transmitting portion and the coupling are disposed on opposite sides of the toner supplying roller with respect to an axial direction of the toner supplying roller.

14. A process cartridge according to claim 1, wherein the rotational direction of the toner supplying roller is the same as a rotational direction of the feeding member.

15. A process cartridge according to claim 1, wherein the second driving force transmitting portion engages with the first driving force transmitting portion so as to transmit the driving force from the first driving force transmitting portion to the developing roller.

16. A process cartridge according to claim 1, wherein the coupling includes a plurality of projections that extend from a side of the coupling opposite the toner supplying roller.

17. A process cartridge comprising:

a rotatable photosensitive drum;

a first casing rotatably supporting the photosensitive drum;

a rotatable developing roller;

a rotatable toner supplying roller provided in contact with the developing roller, the toner supplying roller being configured to supply toner to the developing roller;

a second casing rotatably supporting the developing roller and the toner supplying roller, the second casing including (i) a toner chamber configured to contain toner and (ii) a developing chamber in which the toner supplying roller is positioned;

a feeding member provided in the toner chamber and configured to feed the toner from the toner chamber to the developing chamber;

a coupling operatively connected to the toner supply roller and configured to receive a driving force for driving the toner supplying roller, the developing roller, and the feeding member;

wherein the developing roller is configured to receive the driving force from the coupling via the toner supplying roller, wherein the process cartridge is configured such that, when the coupling receives the driving force and the process cartridge is oriented with the developing roller positioned above the toner chamber, (i) a rotational direction of the developing roller is opposite to a rotational direction of the toner supplying roller, (ii) a part of a surface of the toner supplying roller rotates from a first position at which the part of the surface of the toner supply roller contacts a surface of the developing roller to a second position where the part of the surface of the toner supplying roller moves out of contact with the surface of the developing roller, with the first position being above the second position, (iii) the feeding member feeds toner upward from the toner chamber to the developing chamber, and (iv) a speed of the surface of the toner supplying roller is greater than a speed of the surface of the developing roller, and wherein the developing roller is movable towards and away from the photosensitive drum in response to movement of the second casing relative to the first casing.

18. A process cartridge according to claim 17, wherein the toner supplying roller and a wall of the developing chamber define a space therebetween for storing the toner.

19. A process cartridge according to claim 17, wherein a diameter of the toner supplying roller is greater than a diameter of the developing roller.

20. A process cartridge according to claim 17, wherein a ratio of the speed of the surface of the toner supplying roller to the speed of the surface of the developing roller is:

$$1.3 \leq \text{toner supplying roller/developing roller} \leq 1.8.$$

21. A process cartridge according to claim 17, wherein the toner supplying roller includes an elastic layer.

22. A process cartridge according to claim 17, wherein the toner supplying roller includes a sponge configured to store the toner.

23. A process cartridge according to claim 17, wherein the coupling is provided at an end of a shaft of the toner supplying roller.

24. A process cartridge according to claim 17, wherein the feeding member is configured to be rotated by the driving force received by the coupling, and the rotational direction of the toner supplying roller is the same as a rotational direction of the feeding member.

25. A process cartridge according to claim 17, wherein the coupling includes a plurality of projections that extend from a side of the coupling opposite the toner supplying roller.

26. A process cartridge comprising:

a rotatable photosensitive drum;

a first casing rotatably supporting the photosensitive drum;

a rotatable developing roller;

a rotatable toner supplying roller provided in contact with the developing roller, the supplying roller being configured to supply toner to the developing roller;

a second casing rotatably supporting the developing roller and the toner supplying roller; the second casing including (i) a toner chamber to contain toner and (ii) a developing chamber in which the toner supplying roller is positioned;

a rotatable feeding member provided in the toner chamber and configured to feed the toner from the toner chamber to the developing chamber;

a coupling operatively connected to the toner supplying roller and configured to receive a driving force for rotating the toner supplying roller, the developing roller, and the feeding member, a first gear operatively connected to the toner supplying roller and configured to transmit the driving force received by the coupling to the developing roller; and a second gear operatively connected to the developing roller and configured to transmit the driving force from the first gear to the developing roller, wherein the process cartridge is configured such that, when the coupling receives the driving force and the process cartridge is oriented with the developing roller positioned above the toner chamber, (i) a rotational direction of the developing roller is opposite to a rotational direction of the toner supplying roller, (ii) a part of a surface of the toner supplying roller rotates from a first position at which the part of the surface of the toner supplying roller contacts a surface of the developing roller to a second position where the part of the surface of the toner supplying roller separates from the surface of the developing roller, with the first position being above the second position, (iii) the feeding member feeds toner upward from the toner chamber to the developing chamber, and (iv) a speed of the surface of the toner supplying roller is greater than a speed of the surface of the developing roller, and wherein the developing roller is movable towards and away from the photosensitive drum in response to movement of the second casing relative to the first casing.

27. A process cartridge according to claim 26, wherein at least a part of the coupling is movable relative to the toner supplying roller in a direction crossing a rotational axis of the toner supplying roller.

28. A process cartridge according to claim 27, wherein the coupling is an Oldham coupling.

29. A process cartridge according to claim 26, wherein the toner supplying roller and a wall of the development chamber define a space therebetween for storing the toner.

30. A process cartridge according to claim 26, wherein a diameter of the toner supplying roller is greater than a diameter of the developing roller.

31. A process cartridge according to claim 26, wherein the first gear and the second gear engage with each other, and a number of teeth of the second gear is greater than a number of teeth of the first gear.

32. A process cartridge according to claim 26, wherein a ratio of the speed of the surface of the toner supplying roller to the speed of the surface of the developing roller is:

$$1.3 \leq \text{toner supplying roller/developing roller} \leq 1.8.$$

33. A process cartridge according to claim 26, wherein the toner supplying roller includes an elastic layer.

34. A process cartridge according to claim 26, wherein the toner supplying roller includes a sponge configured to store the toner.

35. A process cartridge according to claim 26, wherein the driving force is transmitted from the second gear to the feeding member.

36. A process cartridge according to claim 35, wherein the second gear transmits the driving force to the feeding member via at least one other gear.

37. A process cartridge according to claim 35, further comprising:

a first idler gear engaging with the second gear;

a second idler gear engaging with the first idler gear; and a feeding member gear operatively connected to the feeding member and engaging with the second idler gear, wherein the driving force is transmitted from the second gear to the feeding member via the first idler gear, the second idler gear, and the feeding member gear.

38. A process cartridge according to claim 26, wherein the coupling is provided at an end of a shaft of the toner supplying roller.

39. A process cartridge according to claim 26, wherein the first gear and the coupling are disposed on opposite sides of the toner supplying roller with respect to an axial direction of the toner supplying roller.

40. A process cartridge according to claim 26, wherein the rotational direction of the toner supplying roller is the same as a rotational direction of the feeding member.

41. A process cartridge according to claim 26, wherein the second gear engages with the first gear so as to transmit the driving force from the first gear to the developing roller.

42. A process cartridge according to claim 26, wherein the coupling includes a plurality of projections that extend from a side of the coupling opposite the toner supplying roller.

43. A process cartridge comprising:

a rotatable photosensitive drum;

a first casing rotatably supporting the photosensitive drum;

a rotatable developing roller;

a rotatable toner supplying roller provided in contact with the developing roller and configured to supply toner to the developing roller, the toner supplying roller including a shaft;

a second casing including (i) a toner chamber configured to contain toner and (ii) a developing chamber in which the toner supplying roller is positioned;

a rotatable feeding member provided in the toner chamber and configured to feed the toner from the toner chamber to the developing chamber;

a developing blade provided in contact with the developing roller and configured to regulate toner on a surface of the developing roller, a coupling provided at the shaft of the toner supplying roller and configured to receive a driving force; and a plurality of gears configured to transmit the driving force from the toner supplying roller to the developing roller and the feeding member such that (i) the toner supplying roller and the feeding member rotate in a direction opposite to a rotational direction of the developing roller, and (ii) a speed of a surface of the toner supplying roller is greater than a speed of the surface of the developing roller, wherein the process cartridge is configured such that, when the coupling receives the driving force and the process cartridge is oriented with the developing chamber positioned above the toner chamber, (i) a part of the surface of the toner supplying roller rotates from a first position at which the part of the surface of the toner supply roller contacts the surface of the developing roller to a second position where the part of the surface of the toner supplying roller moves out of contact with the surface of the developing roller, with the first position being above the second position, and (ii) the feeding member feeds toner upward from the toner chamber to the developing chamber, wherein the developing roller is movable towards and away from the photosensitive drum in response to movement of the second casing relative to the first casing.

44. A process cartridge according to claim 43, wherein at least a part of the coupling is movable relative to the toner supplying roller in a direction crossing a rotational axis of the toner supplying roller.

45. A process cartridge according to claim 43, wherein the coupling is an Oldham coupling.

46. A process cartridge according to claim 43, wherein the toner supplying roller and a wall of the developing chamber define a space therebetween for storing the toner.

47. A process cartridge according to claim 43, wherein a diameter of the toner supplying roller is greater than a diameter of the developing roller.

48. A process cartridge according to claim 43, wherein a ratio of the speed of the surface of the toner supplying roller to the speed of the surface of the developing roller is:

$$1.3 \leq \text{toner supplying roller/developing roller} \leq 1.8.$$

49. A process cartridge according to claim 43, wherein the toner supplying roller includes an elastic layer.

50. A process cartridge according to claim 43, wherein the toner supplying roller includes a sponge configured to store the toner.

51. A process cartridge according to claim 43, wherein the coupling and one of the gears are disposed on different sides of the toner supplying roller with respect to an axial direction of the toner supplying roller.

52. A process cartridge according to claim 43, wherein the rotational direction of the toner supplying roller is the same as the rotational direction of the feeding member.

53. A process cartridge according to claim 43, wherein the coupling includes a plurality of projections that extend from a side of the coupling opposite the toner supplying roller.

* * * * *